United States Patent
Yang et al.

(10) Patent No.: US 10,165,082 B2
(45) Date of Patent: Dec. 25, 2018

(54) METHOD AND APPARATUS FOR MANAGING CONNECTION BETWEEN PLURALITY OF DEVICES OVER NETWORK

(71) Applicant: LG ELECTRONICS INC., Seoul (KR)

(72) Inventors: Seungryul Yang, Seoul (KR); Kyoungsoo Moon, Seoul (KR); Jinpil Kim, Seoul (KR); Seungjoo An, Seoul (KR); Jinwon Lee, Seoul (KR); Donghyun Kang, Seoul (KR); Kyungho Kim, Seoul (KR); Hyeonjae Lee, Seoul (KR); Younghwan Kwon, Seoul (KR); Jinkwon Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 39 days.

(21) Appl. No.: 15/036,265

(22) PCT Filed: Nov. 13, 2014

(86) PCT No.: PCT/KR2014/010905
§ 371 (c)(1),
(2) Date: May 12, 2016

(87) PCT Pub. No.: WO2015/072764
PCT Pub. Date: May 21, 2015

(65) Prior Publication Data
US 2016/0301772 A1 Oct. 13, 2016

Related U.S. Application Data

(60) Provisional application No. 61/976,472, filed on Apr. 7, 2014, provisional application No. 61/954,540, filed
(Continued)

(51) Int. Cl.
*H04L 29/08* (2006.01)
*G06F 8/60* (2018.01)
(Continued)

(52) U.S. Cl.
CPC ............... *H04L 67/34* (2013.01); *G06F 8/60* (2013.01); *G06F 8/61* (2013.01); *H04L 9/3271* (2013.01);
(Continued)

(58) Field of Classification Search
CPC ........................................................ G06F 8/60
(Continued)

(56) References Cited

U.S. PATENT DOCUMENTS

2005/0228621 A1\* 10/2005 Matsuo .................. H04L 41/22
703/1
2006/0205349 A1\* 9/2006 Passier .................. H04R 27/00
455/41.2
(Continued)

FOREIGN PATENT DOCUMENTS

KR  10-2008-0075643 A  8/2008
KR  10-2012-0089125 A  8/2012
(Continued)

OTHER PUBLICATIONS

Whitson Gordon; "What is UPnP and How Do I Use it to Stream Media to My TV"; Lifehacker.com website (full URL in reference); May 20, 2011 (Year: 2011).\*
(Continued)

*Primary Examiner* — Qing Chen
*Assistant Examiner* — Clint Thatcher
(74) *Attorney, Agent, or Firm* — Birch, Stewart, Kolasch & Birch, LLP

(57) ABSTRACT

The present invention relates to a method for managing a connection between a first device and a second device in a
(Continued)

network. The method may include requesting application information to the second device, the application information including information related to a specific application included in the second device for an interactive service, obtaining the information related to the specific application from the second device in response to the request, and performing the connection between the first device and the second device based on the information related to the specific application.

6 Claims, 33 Drawing Sheets

Related U.S. Application Data on Mar. 17, 2014, provisional application No. 61/938,163, filed on Feb. 11, 2014, provisional application No. 61/927,455, filed on Jan. 14, 2014, provisional application No. 61/918,666, filed on Dec. 20, 2013, provisional application No. 61/903,902, filed on Nov. 13, 2013.

(51) Int. Cl.
*H04L 9/32* (2006.01)
*G06F 8/61* (2018.01)
*H04L 29/06* (2006.01)

(52) U.S. Cl.
CPC .......... *H04L 63/0853* (2013.01); *H04L 67/02* (2013.01); *H04L 67/04* (2013.01); *H04L 67/12* (2013.01); *H04L 67/303* (2013.01)

(58) Field of Classification Search
USPC .......................................................... 717/177
See application file for complete search history.

(56) References Cited

U.S. PATENT DOCUMENTS

| | | | |
|---|---|---|---|
| 2011/0145812 A1* | 6/2011 | Kong | H04N 1/00222 717/178 |
| 2012/0129503 A1* | 5/2012 | Lindeman | H04W 4/001 455/414.1 |
| 2012/0198483 A1 | 8/2012 | Jin et al. | |
| 2012/0221738 A1* | 8/2012 | Schroeder, Jr. | G06F 9/468 709/229 |
| 2013/0074165 A1* | 3/2013 | Dhaene | G06F 21/34 726/5 |
| 2013/0210488 A1 | 8/2013 | Lee et al. | |
| 2014/0090007 A1* | 3/2014 | Okubo | H04N 21/4302 725/153 |
| 2016/0113048 A1* | 4/2016 | Barathalwar | H04W 8/005 455/11.1 |

FOREIGN PATENT DOCUMENTS

| | | |
|---|---|---|
| KR | 10-2012-0136586 A | 12/2012 |
| KR | 10-2013-0093912 A | 8/2013 |
| KR | 10-2013-0107427 A | 10/2013 |

OTHER PUBLICATIONS

"Universal Plug and Play"; Wikipedia.org website; Sep. 15, 2013 (Year: 2013).*

* cited by examiner

FIG. 12

| | Action Name |
|---|---|
| 1200 | SearchAppInfo() or GetAppInfo() |

| | Argument | Direction |
|---|---|---|
| 1210 | AppID | IN |
| 1220 | RetrieveCriteria | IN |
| 1230 | DeviceProfile | IN |
| 1240 | Filter | IN |
| 1250 | AppInfo | OUT |

FIG. 13

|  | Action Name |
|---|---|
| 1300 | SimpleGetAppInfo() |

|  | Argument | Direction |
|---|---|---|
| 1310 | AppID | IN |
| 1320 | AppInfo | OUT |

FIG. 14

| | Action Name |
|---|---|
| 1400 | GetAvailableApp() |

| | Argument | Direction |
|---|---|---|
| 1410 | AppID | IN |
| 1420 | RetrieveCriteria | IN |
| 1430 | DeviceProfile | IN |
| 1440 | Filter | IN |
| 1450 | AvailableApp | OUT |

FIG. 15

|  | Action Name |
|---|---|
| 1500 | GetRunningApp() |

|  | Argument | Direction |
|---|---|---|
| 1510 | RunningAppInfo | OUT |

FIG. 16

|      | Action Name        |
| ---- | ------------------ |
| 1600 | GetRunningStatus() |

|      | Argument       | Direction |
| ---- | -------------- | --------- |
| 1610 | AppID          | IN        |
| 1620 | RunningStatus  | OUT       |

FIG. 17

|      | Action Name      |
|------|------------------|
| 1700 | ActivateAppByID()|

|      | Argument  | Direction |
|------|-----------|-----------|
| 1710 | AppID     | IN        |
| 1720 | Parameter | IN        |

FIG. 18

| | Action Name |
|---|---|
| 1800 | ActivateAppByURI() |

| | Argument | Direction |
|---|---|---|
| 1810 | ActivationURI | IN |
| 1820 | AppInfo | IN |
| 1830 | Parameter | IN |
| 1840 | AppID | OUT |

FIG. 19

| | Action Name |
|---|---|
| 1900 | DeactivateApp() |

| | Argument | Direction |
|---|---|---|
| 1910 | AppIDs | IN |
| 1920 | StoppedAppIDs | OUT |

FIG. 20

|      | Action Name      |
|------|------------------|
| 2000 | InstallAppByID() |

|      | Argument  | Direction |
|------|-----------|-----------|
| 2010 | AppID     | IN        |
| 2020 | Parameter | IN        |

FIG. 21

| | Action Name |
|---|---|
| 2100 | InstallAppByURI() |

| | Argument | Direction |
|---|---|---|
| 2110 | InstallationURI | IN |
| 2120 | AppInfo | IN |
| 2130 | Parameter | IN |
| 2140 | AppID | OUT |

FIG. 22

|      | Action Name      |
|------|------------------|
| 2200 | UninstallApp()   |

|      | Argument        | Direction |
|------|-----------------|-----------|
| 2210 | AppID           | IN        |
| 2220 | UnintalledAppIDs | OUT      |

FIG. 23

| | Action Name |
|---|---|
| 2300 | GetAppInstallationStatus() |

| | Argument | Direction |
|---|---|---|
| 2310 | AppIDs | IN |
| 2320 | InstallationStatus | OUT |

FIG. 24

| | Action Name |
|---|---|
| 2400 | GetAppConnectionInfo() |

| | Argument | Direction |
|---|---|---|
| 2410 | AppIDs | IN |
| 2420 | ConnectionInfo | OUT |

FIG. 25

| | Action Name |
|---|---|
| 2500 | ConnectApptoApp() |

| | Argument | Direction |
|---|---|---|
| 2510 | AppID | IN |
| 2520 | ConnectionID | OUT |

FIG. 26

|  | Action Name |
|---|---|
| 2600 | DisconnectApptoApp() |

|  | Argument | Direction |
|---|---|---|
| 2610 | ConnectionIDs | IN |
| 2620 | DisconnectedConnectionIDs | OUT |

FIG. 27

|  | Action Name |
|---|---|
| 2700 | GetCurrentConnectionInfo() |

|  | Argument | Direction |
|---|---|---|
| 2710 | ConnectionIDs | IN |
| 2720 | ConnectionAppIDs | OUT |

FIG. 28

|  | Action Name |
|---|---|
| 2800 | GetSupportedTargetFields() |

|  | Argument | Direction |
|---|---|---|
| 2810 | SupportedTargetFields | OUT |

FIG. 29

|      | State Variable name     | Data type |
|------|-------------------------|-----------|
| 2901 | AppInfoList             | string    |
| 2902 | MSSAvailableApp         | string    |
| 2903 | SupportedTargetFields   | string    |
| 2904 | A_ARG_TYPE_AppID        | string    |
| 2905 | A_ARG_TYPE_Target       | string    |
| 2906 | A_ARG_TYPE_TargetFields | string    |
| 2907 | A_ARG_TYPE_Filter       | string    |
| 2908 | RunningAppList          | string    |
| 2909 | A_ARG_TYPE_URI          | string    |
| 2910 | A_ARG_TYPE_Parameters   | string    |
| 2911 | A_ARG_TYPE_Parameters   | string    |

# METHOD AND APPARATUS FOR MANAGING CONNECTION BETWEEN PLURALITY OF DEVICES OVER NETWORK

CROSS REFERENCE TO RELATED APPLICATIONS

This application is the National Phase of PCT International Application No. PCT/KR2014/010905, filed on Nov. 13, 2014, which claims priority under 35 U.S.C. 119(e) to U.S. Provisional Application Nos. 61/903,902, filed on Nov. 13, 2013, 61/918,666, filed on Dec. 20, 2013, 61/927,455, filed on Jan. 14, 2014, 61/938,163, filed on Feb. 11, 2014, 61/954,540, filed on Mar. 17, 2014, 61/976,472, filed on Apr. 7, 2014, all of which are hereby expressly incorporated by reference into the present application.

TECHNICAL FIELD

The present invention relates to a method and apparatus for managing a connection between a plurality of devices in a network and, more particularly, to a method and apparatus for managing applications in order to provide an interactive service between a plurality of devices and setting up a connection between the applications.

BACKGROUND ART

Conventionally, in order to guarantee compatibility between devices, a specific type of service based on a specific technology has been defined as each standard protocol. Accordingly, in order to interoperate a new type of service between devices connected to a network, the corresponding service itself has to be standardized as a specific standard technology, or there is inefficiency in which all of basic protocols for interoperability between devices other than a function unique to a service need to be included in the corresponding service itself.

DISCLOSURE

Technical Problem

An embodiment of the present invention provides a method for providing an interactive service between a device A connected to a network and a device B connected to another network.

Furthermore, an embodiment of the present invention provides a method for providing an interactive service by implementing an interactive service so that it is always running in a plurality of devices connected over a network.

Furthermore, an embodiment of the present invention provides a method for providing an interactive service by enabling a device to notify a user that what application needs to be installed and executed.

Furthermore, an embodiment of the present invention provides a method for enabling the management of an application of the other device, such as installation, running, running stop, and uninstallation, through one device.

Furthermore, an embodiment of the present invention provides a method for enabling a permitted specific user or device only to manage an application of another device.

Furthermore, an embodiment of the present invention provides a method for sharing information for an interaction between applications of a plurality of devices.

Furthermore, an embodiment of the present invention provides a method capable of simultaneously supporting connections between a plurality of devices by identifying the connections between the plurality of devices.

Furthermore, an embodiment of the present invention provides a clock synchronization or content synchronization method in order to provide an interactive service between a plurality of devices.

Furthermore, an embodiment of the present invention provides a method for discovering a device supporting the management, connection management, and synchronization of applications of a plurality of devices.

Furthermore, an embodiment of the present invention provides a method for exchanging additional information about the management, connection management, and synchronization service of applications of a plurality of devices.

Technical Solution

An embodiment of the present invention provides a method for managing a connection between a first device and a second device in a network, including requesting application information to the second device, the application information including information related to a specific application included in the second device for an interactive service, obtaining the information related to the specific application from the second device in response to the request, and performing the connection between the first device and the second device based on the information related to the specific application.

In an embodiment of the present invention, the specific application may be identified by application identifier information included when the application information is requested.

In an embodiment of the present invention, the method may further include requesting the installation of the specific application to the second device. The specific application may be installed based on application identifier information or application address information included when the installation is requested.

In an embodiment of the present invention, the method may further include requesting the activation of the specific application to the second device. The specific application may be activated based on application identifier information or application address information included when the activation is requested.

In an embodiment of the present invention, the method may further include requesting an authentication check to the second device. The authentication check may be performed by comparing code information included when the authentication check is requested with code information included in the second device.

In an embodiment of the present invention, the method may further include requesting application connection information to the second device. The connection information may include at least one of protocol information and connection address information, and applications between the first device and the second device may be connected based on application identifier information when the connection information is requested.

In an embodiment of the present invention, the method may further include performing synchronization between the first device and the second device. The synchronization may be performed based on the application connection information.

Furthermore, an embodiment of the present invention provides an apparatus for managing a connection between devices in a network, including a controller configured to request application information to a target device, obtain the application information from the target device, and perform a connection with the target device based on the obtained application information and a network interface configured to transmit and receive data to and from the connected target device. The application information is indicative of information related to a specific application included in the target device for an interactive service.

Advantageous Effects

In accordance with an embodiment of the present invention, in order to interoperate a new type of service between devices connected over a network, the corresponding service itself does not need to be standardized. Inefficiency in which all of basic protocols for interoperability between devices other than a function unique to a service has to be included in the corresponding service itself can be obviated. Accordingly, everybody can easily provide an interactive service in an application form, and a manufacturer can reduce additional development resources necessary to provide such a service.

DESCRIPTION OF DRAWINGS

FIGS. 3 and 4 are embodiments to which the present invention may be applied, wherein FIG. 3 shows basic architecture to which a multi-screen service is applied and FIG. 4 shows architecture to which an extended multi-screen service is applied.

FIGS. 12 to 28 illustrate actions for application management and arguments thereof according to embodiments to which the present invention may be applied.

FIG. 12 shows a first application information-obtaining action and arguments thereof according to an embodiment to which the present invention may be applied.

FIG. 13 shows a second application information-obtaining action and arguments thereof according to an embodiment to which the present invention may be applied.

FIG. 14 shows an available application information-obtaining action and arguments thereof according to an embodiment to which the present invention may be applied.

FIG. 15 shows a running application information-obtaining action and an argument thereof according to an embodiment to which the present invention may be applied.

FIG. 16 shows a running status information-obtaining action and arguments thereof according to an embodiment to which the present invention may be applied.

FIG. 17 shows a first application activation action and arguments thereof according to an embodiment to which the present invention may be applied.

FIG. 18 shows a second application activation action and arguments thereof according to an embodiment to which the present invention may be applied.

FIG. 19 shows a deactivation action and arguments thereof according to an embodiment to which the present invention may be applied.

FIG. 20 shows a first application installation action and arguments thereof according to an embodiment to which the present invention may be applied.

FIG. 21 shows a second application installation action and arguments thereof according to an embodiment to which the present invention may be applied.

FIG. 22 shows an uninstallation action and arguments thereof according to an embodiment to which the present invention may be applied.

FIG. 23 shows an installation status information-obtaining action and arguments thereof according to an embodiment to which the present invention may be applied.

FIG. 24 shows a connection information-obtaining action and arguments thereof according to an embodiment to which the present invention may be applied.

FIG. 25 shows an apptoapp connection (i.e., connection between applications) action and arguments thereof according to an embodiment to which the present invention may be applied.

FIG. 26 shows an apptoapp disconnection (i.e., disconnection between applications) action and arguments thereof according to an embodiment to which the present invention may be applied.

FIG. 27 shows a current connection information-obtaining action and arguments thereof according to an embodiment to which the present invention may be applied.

FIG. 28 shows a searchable field-obtaining action and an argument thereof according to an embodiment to which the present invention may be applied.

FIG. 29 shows state variables for application management according to an embodiment to which the present invention may be applied.

MODE FOR INVENTION

Figure 1:
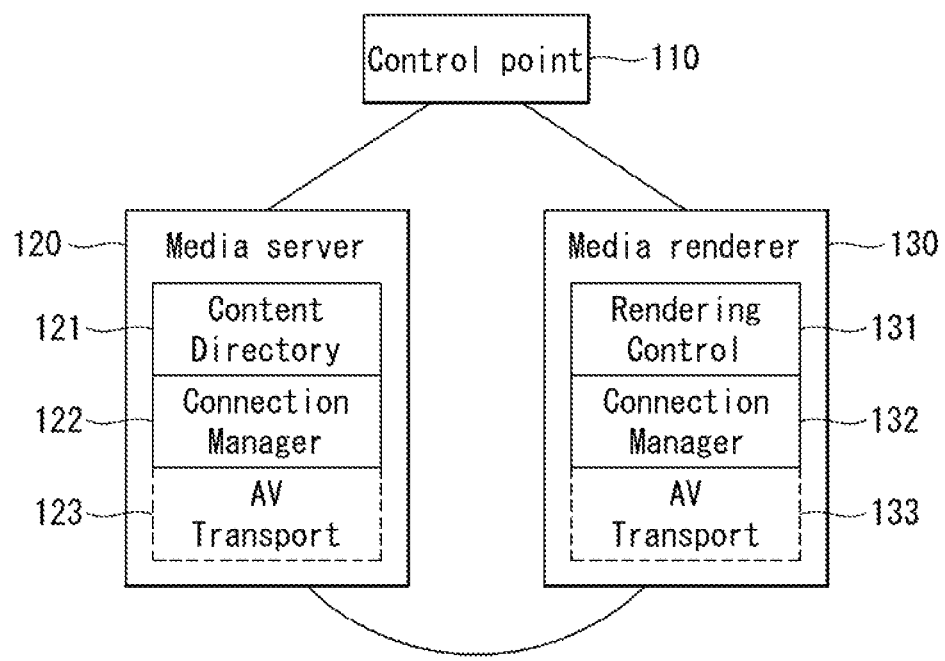
FIG. 1 shows a schematic configuration of a Universal Plug and Play (UPnP) Audio-Visual (AV) network according to an embodiment to which the present invention may be applied.

A Universal Plug and Play (hereinafter referred to as "UPnP") technology and a digital living network alliance (hereinafter referred to as "DLNA") technology enable services and control between home appliances of various manufacturers. In particular, the UPnP technology enables compatible Audio-Visual (AV) services and control between AV devices. The compatible AV services include media streaming, uploading, and downloading.

A UPnP-based network proposed for home networking basically includes a plurality of UPnP devices, services, and a Control Point (CP) logically. In a UPnP network, service means the smallest control unit in a network and is modeled through state variables.

In a UPnP-based network, a CP means a control application having a function for detecting and controlling other devices and/or services. The CP may be operated in a specific device, for example, a physical device, such as a mobile device that is easy to handle by a user.

A UPnP-based AV home network includes a Media Server (MS) for providing media data to the home network, a Media Renderer (MR) for playing back media data over the home network, and an AV Control Point (CP) for controlling the MS and the MR. The MS and the MR are controlled devices controlled by a CP.

The MS (precisely, a Content Directory Service (CDS) within the MS) has previously constructed information about media files and containers (corresponding to directories) gathered therein in the form of each of pieces of object information. The "object" is a term collectively referring to an item having information about one or more media files, for example, pictures, moving images, or audio files and a container having information about a directory. The term "object" may be used as a term referring to an "item" or "container" according to circumstances.

Furthermore, a single item corresponds to one or a plurality of media files. For example, a plurality of media files having the same contents of content with different bit rates may be managed as a single item.

Information about an object is also called "metadata." A variety of types of information about associated content are written in the metadata. For example, an ID assigned to an object corresponding to content, identification information about a container to which the object belongs, a title, information about whether the object is an item or container, the type of media, and a protocol and access position information from which associated content (e.g., a media file) may be obtained are written in the metadata. Furthermore, such metadata is written in a mark-up language form and is stored in storage managed by a CDS regardless of storage in which an associated media file is stored. In this case, the metadata may be stored in a mobile recording medium and provided to the CDS. The metadata of content written as described above is provided according to an action fetched by a control point. Furthermore, part of or the entire metadata may be provided to an MR through the medium of the control point.

In an embodiment of the present invention, UPnP may categorize such devices into a Control Point (CP) device and a control target device. A Digital Media Controller (DMC) and a Digital Media Player (DMP) may be categorized as a CP device, and a Digital MR (DMR), a Digital Media Server (DMS), a Digital Media Printer (DMPr) may be categorized as a control target device.

Furthermore, when a CP device of UPnP or a DMP of DLNA or a DMC requests content metadata to a control target device of UPnP or a DMS of DLNA, the control target device or the DMS may collect a plurality of content metadata (i.e., a list of generated content) corresponding to stored content, respectively, and may transmit them to the CP device or the DMP.

DLNA may define a Digital Media Server (DMS), a Digital Media Player (DMP), a Digital Medial Renderer (DMR), a Digital Media Controller (DMC), and a Digital Media Printer (DMPr), that is, home network devices, and may define a Mobile Digital Media Server (M-DMS), a Mobile Digital Media Player (M-DMP), a Mobile Digital Media Uploader (M-DMU), a Mobile Digital Media Downloader (M-DMD), and a Mobile Digital Media Controller (M-DMC), that is, mobile portable devices. Hereinafter, the DMS may be used as a concept covering the M-DMS, the DMP may be used as a concept covering the M-DMP, and the DMC may be used as a concept covering the M-DMC.

Furthermore, DLNA may be defined by a 2 box model and a 3 box model. The 2 box model includes the DMP and the DMS. In the 2 box model, the DMP enables a user to search for content browsed and distributed by the DMS and to play back the retrieved content. The 3 box model includes the DMC, the DMS, and the DMR. In the 3 box model, the DMC enables a user to search for the content of the DMS to be played back by the DMR.

In this specification, UPnP is basically described as an embodiment for forming a network, but the present invention is not limited thereto. The present invention may be applied to other technologies forming a network.

In an embodiment of the present invention, upon Device to Device (D2D) communication, it may be represented that messages, commands, calls, actions, or requests/responses are exchanged.

In an embodiment of the present invention, in order to deliver a message used upon D2D communication to a required target device, various protocols, such as an Internet Control Message Protocol (ICMP) and an Internet Group Management Protocol (IGMP), in addition to an Internet Protocol (IP) may be used, and the present invention is not limited and applied to a specific protocol.

In an embodiment of the present invention, in order to stably deliver a message used upon D2D communication, control a message flow, solve a collision or congestion between a plurality of messages, and support multiplexing, various protocols, such as a Datagram Congestion Control Protocol (DCCP) and a Stream Control Transmission Protocol (SCTP), in addition to a Transmission Control Protocol (TCP) and a User Datagram Protocol (UDP) may be used, and the present invention is not limited and applied to a specific protocol.

In an embodiment of the present invention, in order to contain a message used upon D2D communication in a variety of pieces of information and deliver it for various purposes, various protocols, such as a Hypertext Transfer Protocol (HTT), a Real-time Transport Protocol (RTP), an Extensible Messaging and Presence Protocol (XMPP), and a File Transfer Protocol (FTP), may be used, and the present invention is not limited and applied to a specific protocol.

In an embodiment of the present invention, when a message used upon D2D communication is delivered through the various protocols, required message data may be contained in various message components, such as the message header and message body of message components defined in each protocol, and delivered, and the present invention is not limited to a specific message component.

In an embodiment of the present invention, when a message used upon D2D communication is delivered through the various protocols, data to be delivered may be delivered in various forms (e.g., a string, an integer, a floating point, Boolean, a character, an array, and a list) defined in each protocol. In order to represent, deliver, and store the data of complicated contents more structurally, a markup method, such as an Extensible Markup Language (XML), a Hypertext Markup Language (HTML), an Extensible Hypertext Markup Language (XHTML), or a JavaScript Object Notation (JSON), text, or an image format may be used, and the present invention is not limited to a specific method.

In an embodiment of the present invention, data included in a message used upon D2D communication may be delivered using various data compression technologies, such as "gzip" (RFC 1952), "deflate" (RFC 1950), and "compress" (RFC 2616), and the present invention is not limited to a specific method.

A UPnP method, that is, one of D2D communication methods applied to embodiments of the present invention, is a D2D communication protocol that belongs to the various technologies and that is a combination of the IP-TCP/UDP-HTTP protocols.

All of UPnP actions proposed according to an embodiment of the present invention may be applied through a combination of various forms of the various layer technologies. All of contents proposed according to an embodiment of the present invention are not limited to a UPnP method. That is, in this specification, a UPnP method is basically described as an embodiment for forming a network, but the present invention is not limited thereto and may be applied to the technologies of the aforementioned methods.

FIG. 1 shows a schematic configuration of a Universal Plug and Play (UPnP) Audio-Visual (AV) network according to an embodiment to which the present invention may be applied.

As shown in FIG. 1, the UPnP-based AV network may be configured to include a Media Server (MS) 120 for providing media data to a network, a Media Renderer (MR) 130 for playing back media data over a network, and a Control Point (CP) 110 for controlling the MS 120 and the MR 130. The MS 120 and the MR 130 are controlled devices controlled by the CP 110.

The MS 120 may include a Content Directory Service (CDS) 121, a connection manager service 122, and an AV transport service 123.

In order to notify the CP 110 of directory information, the MS 120 may notify the CP 110 of information about a media file using its own file system whenever an UPnP action, for example, a browsing action is present. Furthermore, the data of a media file selected through the user interface of the CP 110 may be transmitted using a streaming method between the MS 120 and the MR 130 and played back through the MR 130.

In this case, any one of known various methods may be used as the streaming method. For example, an out-of-band transfer protocol may be used as the streaming method. For detailed example, if a Real-time Transport Protocol (RTP) is used for media transfer, the transfer status of media data may be monitored using a Real Time Control Protocol (RTCP), and a transfer parameter may be controlled based on the transfer state.

The CP 110 may control the MS 120 and the MR 130 and may be performed by fetching an UPnP action provided based on a Standardized Simple Object Access Protocol (SOAP), for example. Furthermore, the CP 110 may subscribe to an event service provided by a device and receive a report regarding a change in the status information of the device.

The MS 120 may include the CDS service 121 for providing a service that discovers media data managed by the CDS unit, the connection manager service 122 for managing a connection with another device, that is, the MR 130, and the AV transport service 123 for enabling control of the playback of media, for example, control, such as play and stop.

The MR 130 may include a rendering control service 131 for enabling control of the brightness and luminosity of a screen when media is presented, a connection manager service 132 for managing a connection with another device, and an AV transport service 133.

The CP 110 may check media file information within a server using the content directory service 121 of the MS 120. When a user selects a specific media file based on the media file information, the CP 110 may set up a connection for media transport between the MS 120 and the MR 130 through the connection manager services 122 and 132 of respective devices. Furthermore, the CP 110 may configure variables for control of the playback of a corresponding media file using the AV transport service 123 or 133, and may request a playback action to the MS (in the case of push mode) or the MR (in the case of pull mode) so that the media file is played back. During the playback, the CP 110 may control the brightness or luminosity of a screen or the volume through the rendering control service 131 of the MR 130.

Furthermore, the CP 110 may subscribe to an event provided by each service and monitor information about a change in the content of the MS 120 or a change in the status of a current media stream.

Accordingly, a user may request media to be played back in a plurality of devices, that is, a plurality of renderers, through a home network, or may move to another place while watching media through a single renderer and continue to watch the media at the place through the renderer.

Figure 2:
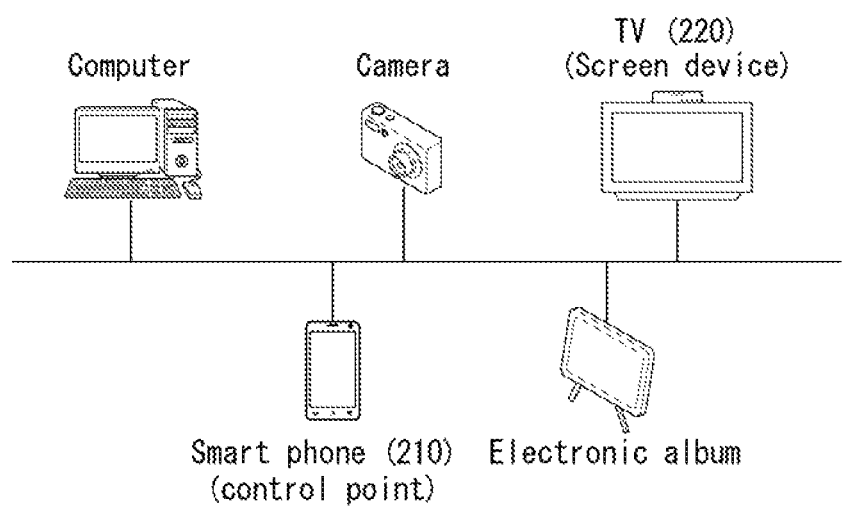
FIG. 2 shows an example of a Universal Plug and Play (UPnP) Audio-Visual (AV) network to which a multi-screen service is applied according to an embodiment to which the present invention may be applied.

FIG. 2 shows an example of a Universal Plug and Play (UPnP) Audio-Visual (AV) network to which a multi-screen service is applied according to an embodiment to which the present invention may be applied.

A network providing a multi-screen service to which an embodiment of the present invention is applied may be connected to various devices. For example, a multi-screen service may be provided if electronic devices capable of an interactive service, such as a computer, a camera, a printer, and an electronic album, in addition to a smart phone 210 and TV 220 are connected, as shown in FIG. 2.

In this case, the multi-screen service may mean a time-sensitive and interactive service provided between various display devices. For example, the multi-screen service may include an implementation-specific application.

Figure 3:
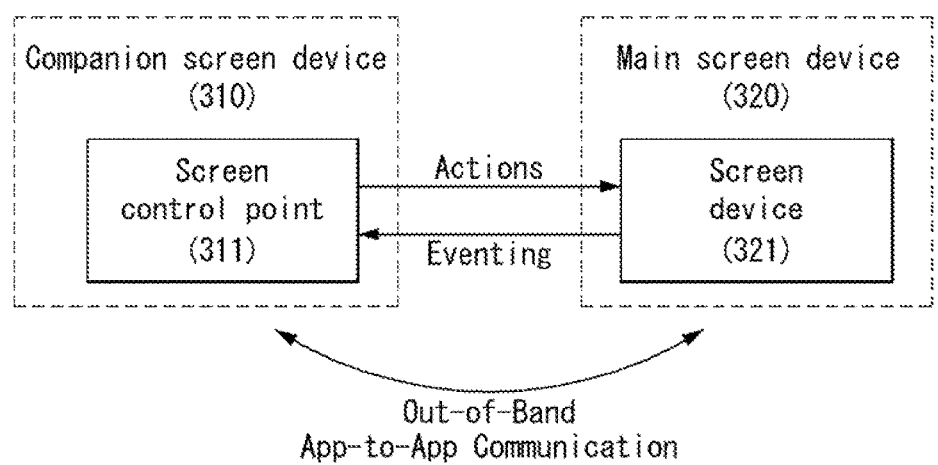
Figure 4:
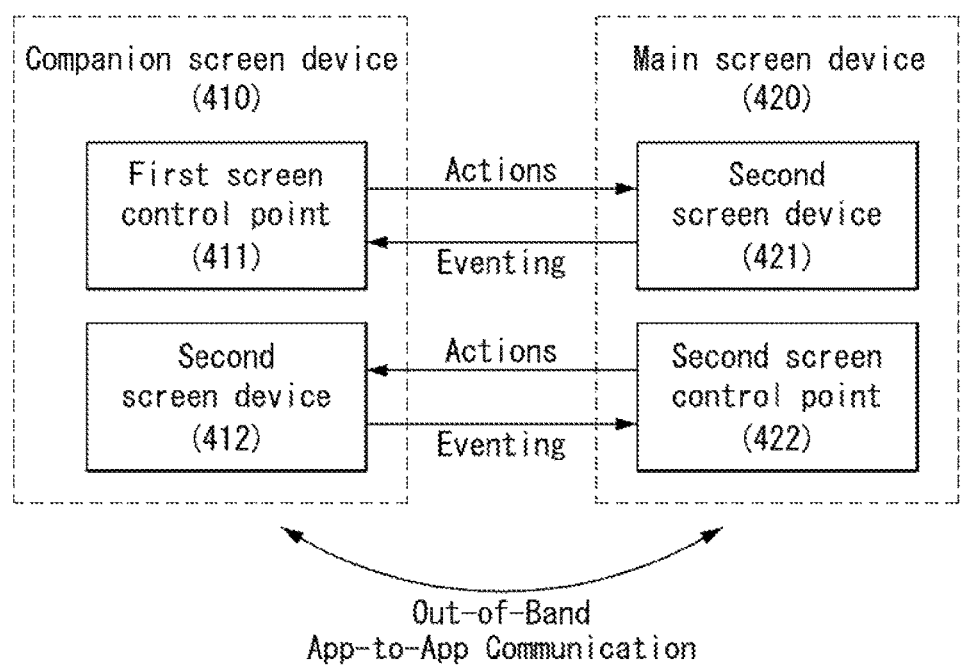

FIGS. 3 and 4 are embodiments to which the present invention may be applied. FIG. 3 shows basic architecture to which a multi-screen service is applied, and FIG. 4 shows architecture to which an extended multi-screen service is applied.

It is assumed that various devices are connected to a network providing a multi-screen service. The devices connected over the network may be categorized into a main screen device and a companion screen device depending on the role of a specific application and/or a method of using the specific application.

First, the main screen device is indicative of a device controlled by a companion screen device. For example, the main screen device may include a lean-back display device, such as TV or a set-top box. Furthermore, any display device may become a main screen device depending on a use scenario. For example, a device, such as a smart phone or a tablet, may become a main screen device.

The companion screen device is indicative of a device controlling the main screen device. For example, the companion screen device may include a lean-forward display device or a handheld display device, such as a smart phone or a tablet. Furthermore, any display device may become a companion screen device depending on a use scenario. For example, a device, such as TV or a set-top box, may become a companion screen device.

FIG. 3 shows architecture for providing an interactive service based on two of various devices connected over a network, for example, a companion screen device 310 and a main screen device 320. In this case, the companion screen device 310 may operate a screen control point 311, and the main screen device 320 may operate as a screen device 321. For example, referring to FIG. 3, the companion screen device 310 may transmit actions for controlling the main screen device 320. The main screen device 320 may transmit an event message to the companion screen device 310 or transmit a response message for the actions to the companion screen device 310. In this case, the companion screen device 310 operates as the screen control point 311, and the main screen device 320 operates as the screen device 312.

Furthermore, an embodiment of the present invention can provide an extended multi-screen service. In this case, the extended multi-screen service may mean a service that requires more sophisticated interactions.

FIG. 4 shows architecture for providing an extended multi-screen service based on two devices connected over a network, for example, a companion screen device 410 and a main screen device 420.

For example, referring to FIG. 4, an operation between a first screen control point 411 and a first screen device 412 is the same as that described with reference to FIG. 3. Furthermore, the main screen device 420 may transmit actions for controlling the companion screen device 410. The companion screen device 410 may transmit an event message to the main screen device 420 or transmit a response message for the actions to the main screen device 420. In this case, the main screen device 420 operates as the second screen control point 411, and the companion screen device 410 operates as the second screen device 412.

That is, the companion screen device 410 may operate as the first screen control point 411 and operate as the second screen device 412 in accordance with the main screen device 420. Furthermore, the main screen device 420 may operate as a first screen device 421 or operate as a second screen control point 422 in accordance with the companion screen device 410.

A screen device may mean a component which is performed along with a screen control point and which is used to provide various interactive services to another display device. The screen device may be designed to be controlled by the screen control point and to operate in conjunction with the screen control point.

In order to support a multi-screen service, it is recommenced that a screen device operates as a main screen device (e.g., a lean-back display device, such as TV or a set-top box) controlled by a companion screen device.

Furthermore, in order to support an extended multi-screen service, it is recommenced that a screen device operates as a companion screen device (e.g., a lean-forward display device or handheld display device, such as a smart phone or a tablet) that controls a main screen device.

Furthermore, a screen control point is indicative of a component which is performed along with a screen device and which is used to provide various interactive services to another display device. The screen control point may be designed to control the screen device in response to a user input and to operate in conjunction with the screen device.

In order to support a multi-screen service, it is recommended that a screen control point operates as a companion screen device (e.g., a lean-forward display device or handheld display device, such as a smart phone or a tablet) that controls a main screen device.

Furthermore, in order to support an extended multi-screen service, it is recommended that a screen control point operates as a main screen device (e.g., a lean-back display device, such as TV or a set-top box) controlled by a companion screen device.

For example, referring to FIG. 4, both the main screen device 420 and the companion screen device 410 may operate as screen devices and also operate as screen control points.

In order to interoperate a new type of service between devices connected over a network, an embodiment of the present invention provides a method and apparatus for providing an interactive service in an application form without a separate protocol. More specifically, there are provided a method and apparatus for managing an application in a network providing a multi-screen service.

For example, if a user wants to use an interactive service X through devices A and B connected over a network, an implementation may be possible so that the interactive service X is always running in the devices A and B. Alternatively, the user may conveniently use the interactive service X if a device notifies the user whether a specific application needs to be installed and/or executed without a need for the user to directly search for an application for the interactive service X in the devices A and B and to install or execute the application.

For another example, devices A and B may have or may not have the same application. If the devices A and B have the same application, the devices A and B may provide an interactive service through application execution. If the devices A and B do not have the same application, an interactive service may be provided by checking that a device requires what application and downloading and/or executing the application.

Furthermore, in an embodiment of the present invention, user convenience can be improved in such a manner that management, such as the installation, running, stopping running, and uninstallation, for an application of the other device is made possible through one device.

Furthermore, in an embodiment of the present invention, a message including an ID and a password may be transmitted so that only a permitted specific user or device may use the interactive service X.

Furthermore, an embodiment of the present invention provides a method for performing a connection between applications installed in a device. For example, if applications capable of an interaction have been installed in devices A and B, the two devices A and B may share information for an interaction, and the applications may directly communicate with each other by sharing the information.

Furthermore, one device, together with the other device, may form a plurality of connections. In this case, the other device may be one device or a plurality of devices. The device may support the plurality of connections at the same time and control the plurality of connections. Furthermore, information about a specific one of the plurality of connections or information about all the connections may be transmitted so that another device is aware of the information.

In an embodiment of the present invention, only a permitted specific user or specific device may be permitted to perform an embodiment described in this specification. To this end, an ID and a password may be included in a message, and the message may be transmitted.

In an embodiment of the present invention, a user may subscribe to an application management service so as to use an interactive service between devices connected over a network. Furthermore, a user's rights to use an application management service may be permitted or limited through a separate right setting process.

In an embodiment of the present invention, a synchronization process between devices may be required in order to use a time-sensitive interactive service between devices connected over a network. For example, a synchronization mechanism, such as basic clock synchronization and content synchronization, may be required.

In an embodiment of the present invention, a device supporting an application management service, a connection establishment service, and a synchronization service may be discovered in a network through a discovery mechanism. Furthermore, devices may exchange additional information about each service through a description mechanism.

Hereinafter, embodiments are described in detail with reference to the accompanying drawings. Redundant contents in various embodiments may be omitted, and a detailed description of terms used in this specification or embodiments may be applied to other embodiments.

Figure 5:
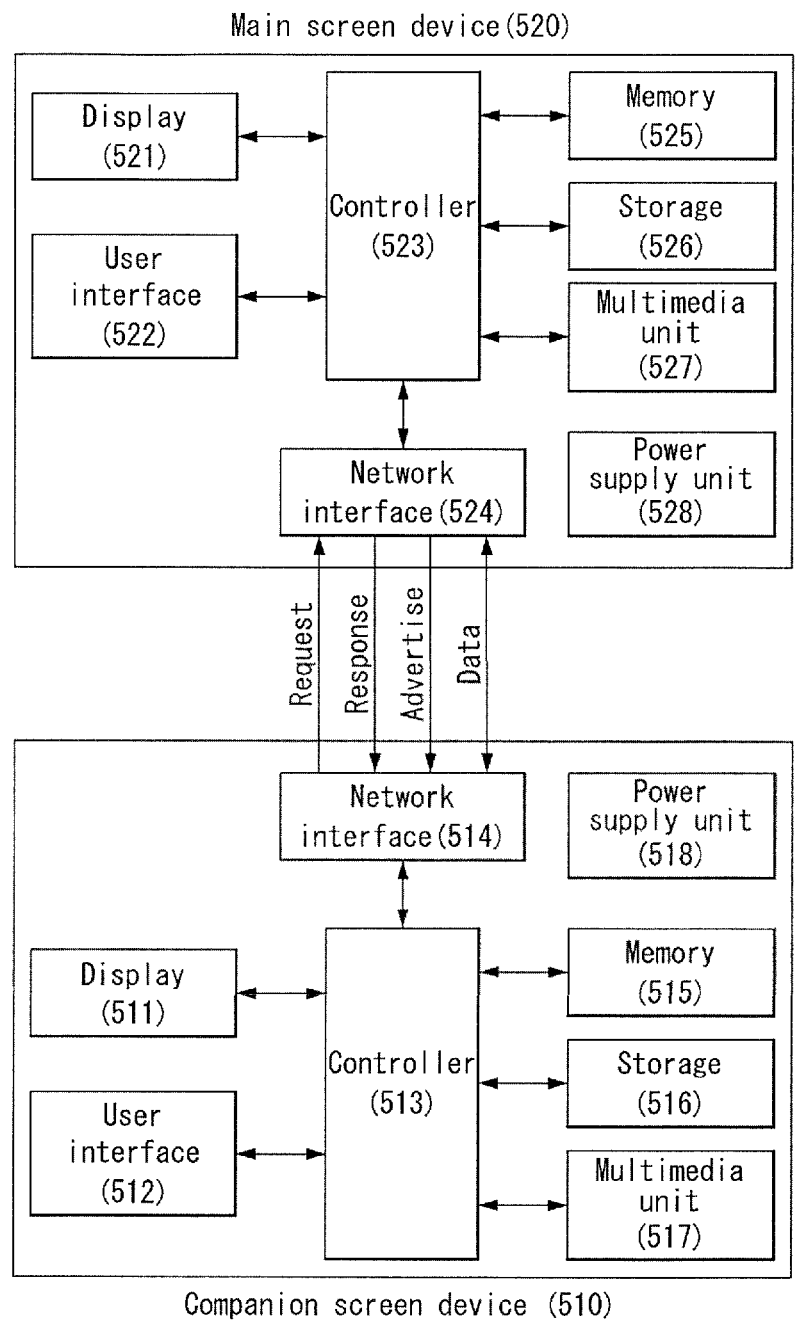
FIG. 5 shows a schematic configuration of a device to which a multi-screen service is applied according to an embodiment to which the present invention may be applied.

FIG. 5 shows a schematic configuration of a device to which a multi-screen service is applied according to an embodiment to which the present invention may be applied.

FIG. 5 is an internal block diagram of a companion screen device 510 and a main screen device 520 providing an extended multi-screen service.

The companion screen device 510 may include a display 511, a user interface 512, a controller 513, a network interface 514, memory 515, storage 516, a multimedia unit 517, and a power supply unit 518.

The display 511 displays data received through the network interface 514 or data stored in the storage 516 on a screen under the control of the controller 513.

The user interface 512 plays the role of a passage that provides information to a user by transmitting a signal from the user to the controller 513 and outputting a signal controlled by the controller 513 through the display 511.

The controller 513 functions to control an overall operation of the companion screen device 510. Various embodiments described in this specification may be performed through the controller 513.

The network interface 514 may receive a message, including at least one of a command, a request, an action, a response, an event message, an advertising message, and data, from an external device or may transmit such a message to an external device. Furthermore, the network interface 514 may be a physical component of the companion screen device 510.

The memory 515 is an optional device implemented in various types of devices and may temporarily store various types of data. For example, the memory 515 may be a volatile type of a physical device.

The storage 516 may store various types of information. For example, the storage 516 may be a nonvolatile type of a physical device, such as an SD card. The storage 516 may include a content storage unit (not shown), a metadata storage unit (not shown), and a buffer (not shown). The content storage unit (not shown) may store media content data. The metadata storage unit (not shown) may store metadata indicative of additional information about content. The metadata storage unit (not shown) may sort and store metadata. The buffer (not shown) may temporarily store various types of data.

The multimedia unit 517 is a device for various types of multimedia playback, and may play back stored content or content received from the outside. The multimedia unit 517 may be implemented in the controller 513 or may be implemented separately from the controller 513.

The power supply unit 518 is supplied with external power or internal power, and it supplies power for the operations of the elements under the control of the controller 513.

Furthermore, the main screen device 520 may include a display 521, a user interface 522, a controller 523, a network interface 524, memory 525, storage 526, a multimedia unit 527, and a power supply unit 528. The elements of the main screen device 520 may perform the same or similar functions as the elements of the companion screen device 510, and a detailed description thereof is omitted.

Figure 6:
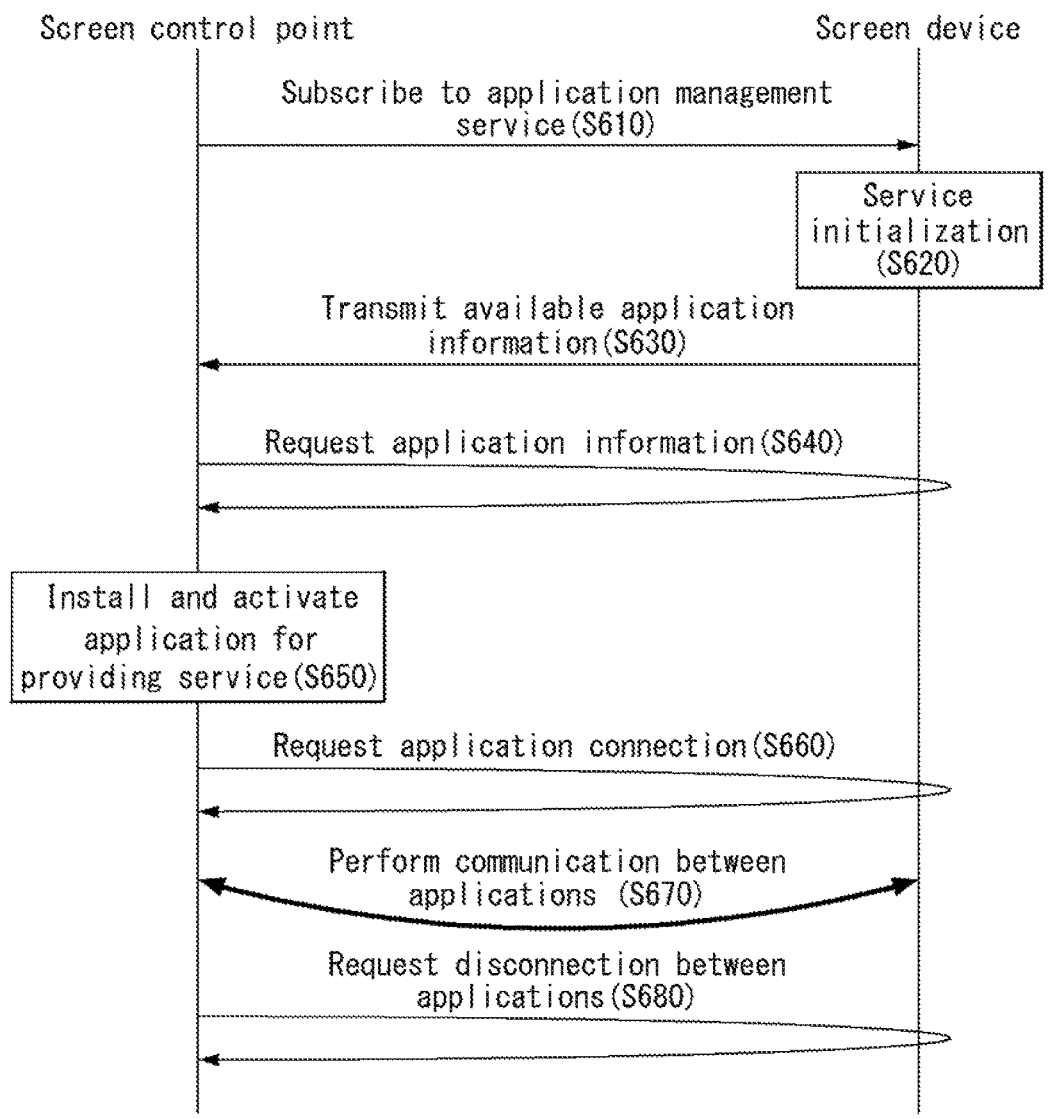
FIG. 6 is a flowchart illustrating an interaction between devices when a multi-screen service is initiated by a screen device according to an embodiment to which the present invention may be applied.

FIG. 6 is a flowchart illustrating an interaction between devices when a multi-screen service is initiated by a screen device according to an embodiment to which the present invention may be applied.

A screen control point may subscribe to an application management service in order to provide a multi-screen service (S610).

If a screen device checks that the screen control point has subscribed to the application management service, it may perform service initialization (S620).

After the service initialization, the screen device may transmit available application information (S630). In this case, the available application information may be transmitted as an event message directly by the screen device or may be transmitted as a response message for a request from the screen control point. In this case, such a process may not be essential for an apptoapp connection.

The screen control point may request specific application information to the screen device (S640). The screen device may transmit the specific application information to the screen control point in response to the request (S640). In this case, the specific application information may be the entire application information or information about a designated application.

The screen control point may receive the specific application information, may install an application for providing the multi-screen service based on the received specific application information, and may execute the application (S650).

When the application is executed, the screen control point may request a connection between applications to the screen device (S660). In this case, an apptoapp connection (i.e., a connection between applications) action may be used. The screen device may transmit a connection identifier to the screen control point in response to the request (S660).

When the connection between applications is established through such a process, the screen control point and the screen device may perform communication through the applications (S670).

Thereafter, if additional communication is not required, the screen control point may request a disconnection between the applications to the screen device (S680). In this case, an application disconnection action "DisconnectApptoApp ( )" may be used. The screen device may transmit disconnection information to the screen control point in response to the request (S680).

Figure 7:
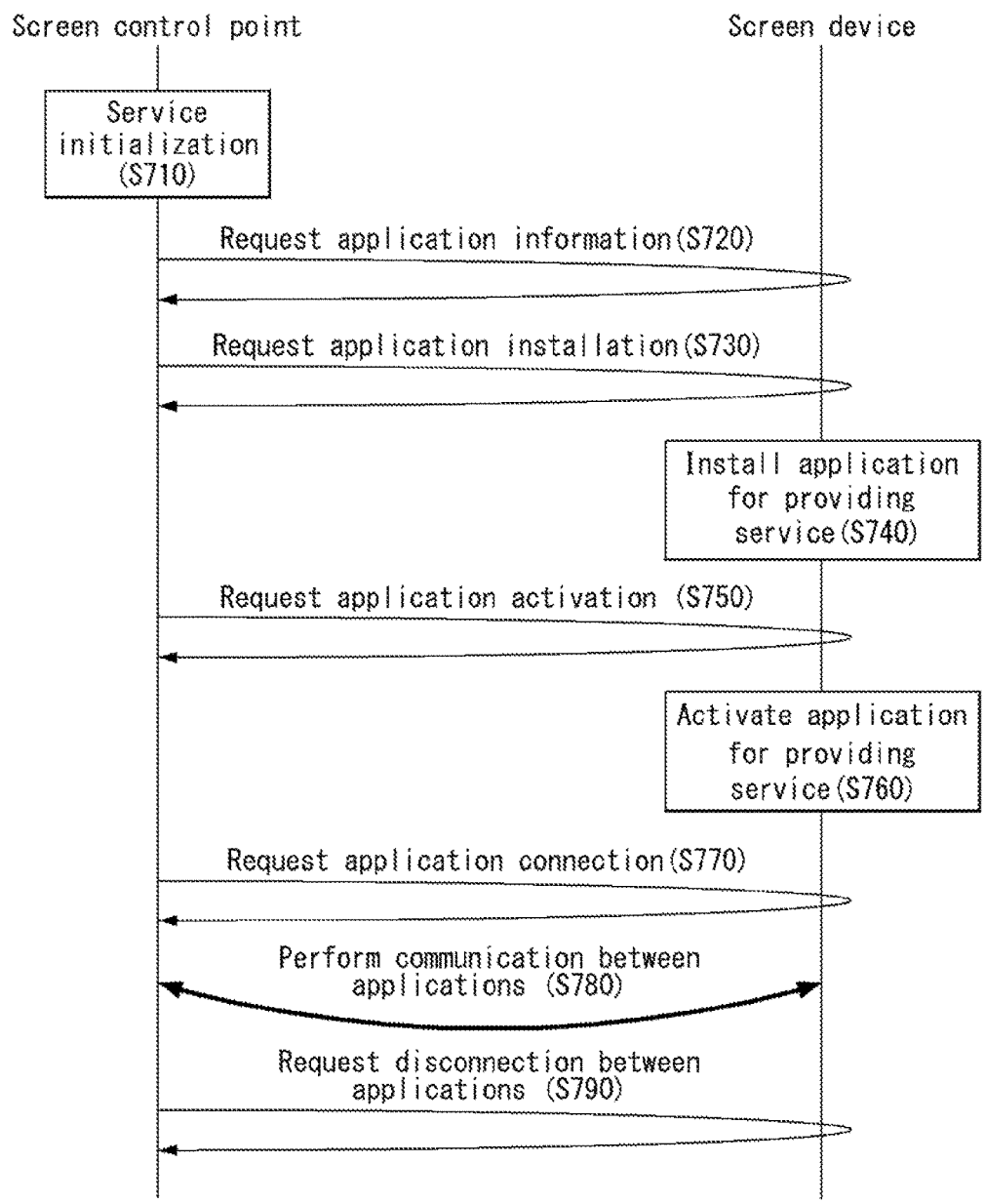
FIG. 7 is a flowchart illustrating an interaction between devices when a multi-screen service is initiated by a controller according to an embodiment to which the present invention may be applied.

FIG. 7 is a flowchart illustrating an interaction between devices when a multi-screen service is initiated by a controller according to an embodiment to which the present invention may be applied.

A screen control point may perform service initialization in order to provide a multi-screen service (S710).

After the service initialization, the screen control point may request application information to a screen device (S720). In this case, an application information request action may be used. The screen device may transmit the application information to the screen control point in response to the request (S720).

The screen control point may request application installation to the screen device (S730). In this case, an application installation action may be used. The application installation action may be performed based on an application identifier or a Uniform Resource Identifier (URI).

The screen device may install an application for providing the multi-screen service in response to the application installation request (S740).

Furthermore, the screen control point may request application activation to the screen device (S750). In this case, an application activation action may be used. The application activation action may include the identifier of an application to be activated. The screen device may execute the application in response to the request (S760).

When the application is executed as described above, the screen control point may request an apptoapp connection to the screen device (S770). In this case, an apptoapp connection action may be used. The screen device may transmit a connection identifier to the screen control point in response to the request (S770).

When the connection between applications is established through such a process, the screen control point and the screen device may perform communication through the applications (S780).

Thereafter, if additional communication is not required, the screen control point may request a disconnection between the applications to the screen device (S790). In this case, an application disconnection action may be used. The screen device may transmit disconnection information to the screen control point in response to the request (S790).

Figure 8:
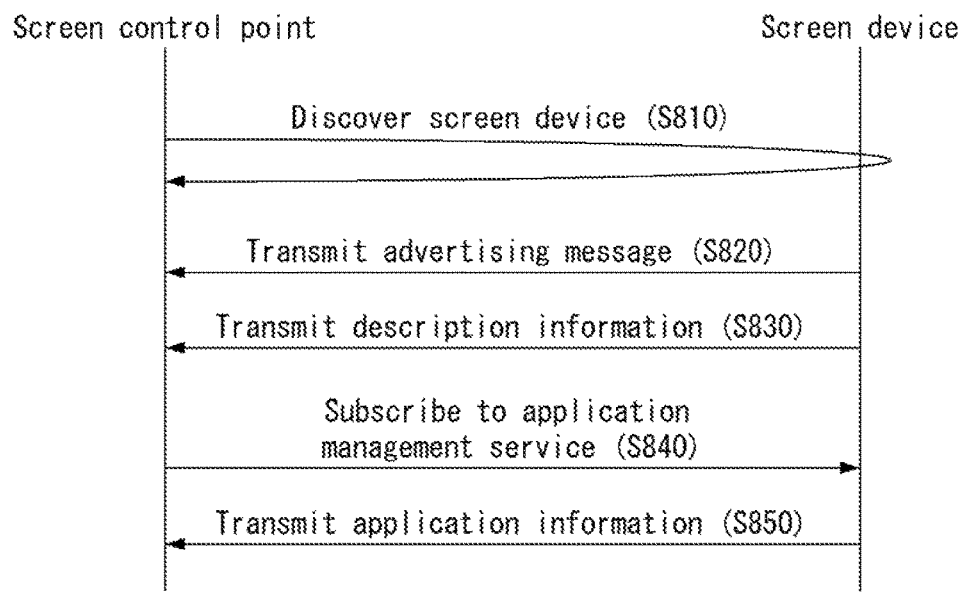
FIG. 8 is a flowchart illustrating an interaction for managing an application connection between devices according to an embodiment to which the present invention may be applied.

FIG. 8 is a flowchart illustrating an interaction for managing an application connection between devices according to an embodiment to which the present invention may be applied.

A screen control point may discover a screen device in order to provide a multi-screen service (S810). In this case, a discovery action may be used. If, as a result of the discovery, the screen device is discovered, the discovered screen device may transmit a response message for the discovery action. For example, the screen device may advertise that it is the screen device, and may advertise an address from which device description document including its own information may be accessed (S820).

Furthermore, the screen device may transmit description information to the screen control point (S830). For example, the description information may include basic device information, information regarding that it is what type of device (e.g., a screen device or a screen control point), and information about a service that may be provided by a device itself (e.g., an application management service or an application connection service).

The screen control point may subscribe to an application management service in order to provide the multi-screen service (S840). If an event message from the screen device does not need to be received, the screen control point may not subscribe to the application management service. In this case, the screen control point may periodically check information related to the screen device.

The screen device may transmit application information to the screen control point (S850). In this case, the application information may be the entire application information of the screen device or information about a designated application.

Figure 9:
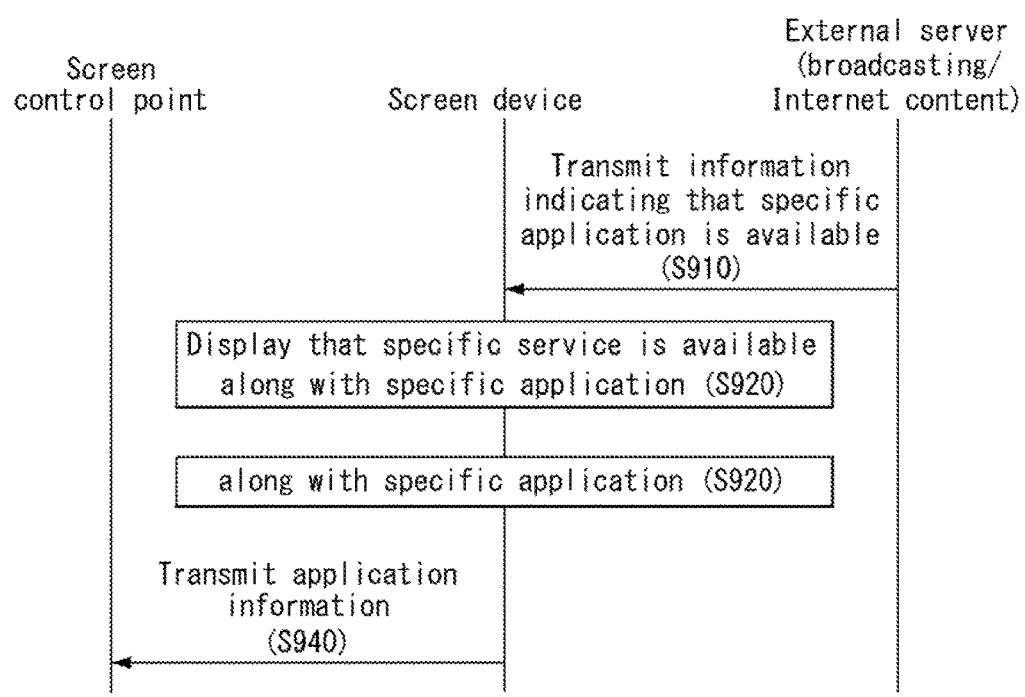
FIG. 9 is a flowchart illustrating a process for controlling an application which is used along with content if the content is provided by an external server according to an embodiment to which the present invention may be applied.

FIG. 9 is a flowchart illustrating a process for controlling an application which is used along with content if the content is provided by an external server according to an embodiment to which the present invention may be applied.

A screen device may receive content from an external server. Furthermore, the screen device may require a specific application in order to use the content. In this case, the content may be broadcasting content or may be content downloadable from the Internet.

The screen device may receive information about an available specific application from the external server (S910).

When the screen device receives the information, it may display that a specific service is available along with the specific application (S920). Furthermore, the screen device may activate the specific application (S930). The activation may be automatically performed by the screen device or may be performed in response to a user input.

The screen device may transmit information about the specific application to the screen control point in order to provide a multi-screen service (S940).

Figure 10:
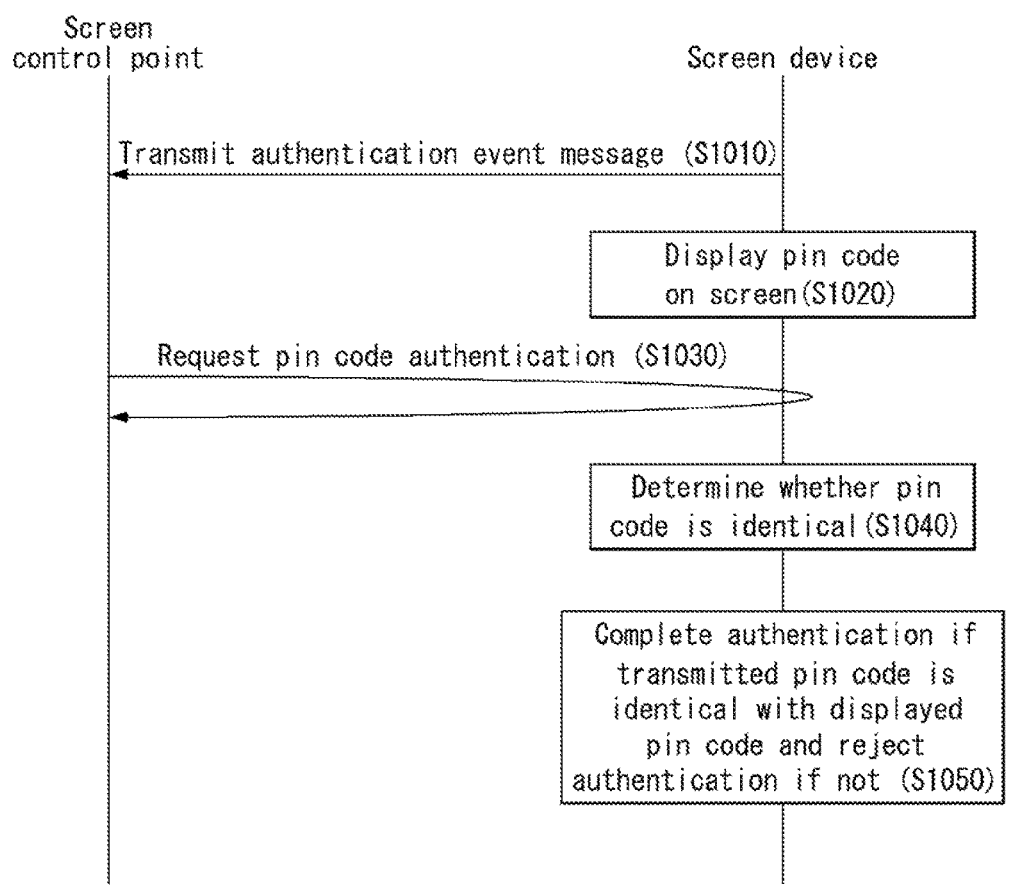
FIG. 10 is a flowchart illustrating an authentication process necessary for an application connection between devices according to an embodiment to which the present invention may be applied.

FIG. 10 is a flowchart illustrating an authentication process necessary for an application connection between devices according to an embodiment to which the present invention may be applied.

A screen device may transmit an event message to only a screen control point that needs to be authenticated (S1010). For example, if a screen control point that requires authentication is present, the screen device changes an authentication variable value and transmits the changed value to the screen control point. In this case, the authentication variable value may be displayed on a screen (S1020).

When the screen control point receives the event message, it may recognize that it requires authentication. Furthermore, the screen control point may request pin-code authentication to the screen device. In this case, the request may be performed by a pin-code authentication action. The pin-code authentication action is used to authenticate an action transmission device or to authenticate the user of an action transmission device.

When the screen device receives the pin-code authentication action, it may check whether the received pin code is the same as the pin code of the screen device (S1040).

If, as a result of the check, the pin code transmitted by the action transmission device is found to be the same as the pin code of the screen device, the action transmission device may be authenticated. If not, the authentication of the action transmission device will be rejected (S1050).

Authentication information, such as the pin code, may be valid for only a limited time. For example, if a service subscription expires or a service subscription has not been performed, the screen control point may experience an authentication procedure again when subscribing to a service.

Figure 11:
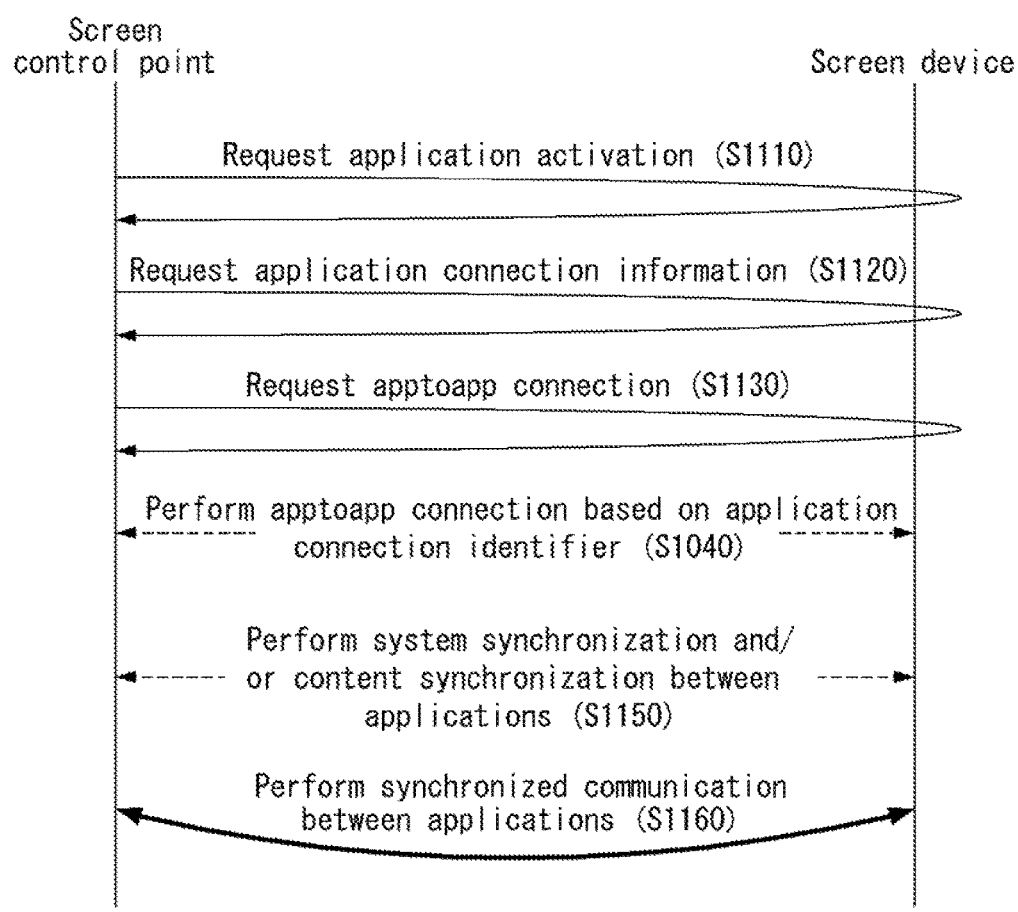
FIG. 11 is a flowchart illustrating a process for performing synchronized communication through an application connection between devices according to an embodiment to which the present invention may be applied.

FIG. 11 is a flowchart illustrating a process for performing synchronized communication through an application connection between devices according to an embodiment to which the present invention may be applied.

A screen control point may request application activation to a screen device (S1110). In this case, an application activation action may be used. The application activation action may include the identifier of an application to be activated. The screen device may execute the application in response to the request.

When the application is executed as described above, the screen control point may request application connection information to the screen device (S1120). In this case, a connection information-obtaining action may be used. The screen device may transmit connection information to the screen control point in response to the request. In this case, the connection information may include a specific portion of an application information list. The connection information may be indicative of information between applications "apptoappinfo." For example, the information between applications "apptoappinfo" may include at least one of specific protocol name information, transport protocol information, and connection address information. In this case, the connection address information may mean access information for communication between applications.

The screen control point may request an apptoapp connection to the screen device based on the connection information (S1130). In this case, an apptoapp connection action may be used. The screen device may transmit a connection identifier to the screen control point in response to the request.

When the apptoapp connection is established through such a process (S1140), the screen control point and the screen device may perform system synchronization and/or content synchronization between applications (S1150).

Furthermore, the screen control point and the screen device may perform synchronized communication through the applications (S1160).

FIGS. 12 to 28 illustrate actions for application management and arguments thereof according to embodiments to which the present invention may be applied.

Action names shown in FIGS. 12 to 28 are only an embodiment, and the present invention should not be construed as being limited to the action names, but should be construed as meanings described in this specification. Furthermore, in the directions of an argument, "IN" may be construed as being input information and "OUT" may be construed as being output information.

FIG. 12 shows a first application information-obtaining action and arguments thereof according to an embodiment to which the present invention may be applied.

The first application information-obtaining action 1200 may enable a screen control point to obtain application information specified by an application identifier. Furthermore, the name of the first application information-obtaining action may be indicated as SearchAppInfo ( ) or GetAppinfo ( ).

The arguments of the first application information-obtaining action may include at least one of an application identifier 1210, reference information 1220, device profile information 1230, filter information 1240, and application information 1250.

In this case, the application identifier 1210 is indicative of information to identify an application from which information is to be obtained. For example, when a specific value "XYZ" is inputted, the application identifier 1210 may be indicative of an application identified by the specific value "XYZ." When a specific value "*" or "(empty string)" is inputted, the application identifier 1210 may mean all the applications of an application information list.

The reference information 1220 is indicative of information to determine the status of an application. For example, the reference information 1220 may be used to determine whether information is information about an available application, information about an activation application, or information about a specific application.

The device profile information 1230 is indicative of information about the profile of a corresponding device. For example, if the device profile information is indicative of resolution "1920×1080," application information satisfying the resolution may be obtained.

The filter information 1240 is indicative of information which is used to obtain application information satisfying a specific condition.

The application information 1250 is indicative of information about the type of arguments within various actions. For example, the application information 1250 may be a specific portion of an application information list variable. The application information list variable is described in detail later with reference to FIG. 29.

The embodiment of FIG. 12 may be performed by the elements of FIG. 5. For example, the controller 513 of the first screen device 510 may transmit the first application information-obtaining action to the second screen device 520 through the network interface 514.

The controller 523 of the second screen device 520 may receive the first application information-obtaining action through the network interface 524. Furthermore, the controller 523 of the second screen device 520 may transmit application information to the first screen device 510 in response to the first application information-obtaining action. In this case, the application information may be information about a specific application determined based on the input information of the first application information-obtaining action. The input information may include at least one of the application identifier 1210, the reference information 1220, the device profile information 1230, and the filter information 1240.

FIG. 13 shows a second application information-obtaining action and arguments thereof according to an embodiment to which the present invention may be applied.

The second application information-obtaining action 1300 may enable a screen control point to obtain only application information specified by an application identifier. Furthermore, the name of the second application information-obtaining action may be indicated as SimpleGetAppinfo ( ).

The arguments of the second application information-obtaining action may include at least one an application identifier 1310 and application information 1320.

In this case, the description of FIG. 12 may be applied to the application identifier 1310 and the application information 132.

The embodiment of FIG. 13 may be performed by the elements of FIG. 5. For example, the controller 513 of the first screen device 510 may transmit the second application information-obtaining action to the second screen device 520 through the network interface 514.

The controller 523 of the second screen device 520 may receive the second application information-obtaining action through the network interface 524. Furthermore, the controller 523 of the second screen device 520 may transmit application information to the first screen device 510 in response to the second application information-obtaining action. In this case, the application information may be information about a specific application determined based on the input information of the second application information-obtaining action. The input information may include the application identifier 1310.

FIG. 14 shows an available application information-obtaining action and arguments thereof according to an embodiment to which the present invention may be applied.

The available application information-obtaining action 1400 may enable information about an available application to be obtained from an action reception device. Furthermore, the name of the available application information-obtaining action 1400 may be indicated as GetAvailableApp ( ) 1400.

The arguments of the available application information-obtaining action 1400 may include at least one of an application identifier 1410, reference information 1420, device profile information 1430, filter information 1440, and available application information 1450.

In this case, the description of FIG. 12 may be applied to the application identifier 1410, the reference information 1420, the device profile information 1430, and the filter information 1440.

The available application information 1450 may mean information about an available application in order to provide a multi-screen service.

The embodiment of FIG. 14 may be performed by the elements of FIG. 5. For example, the controller 513 of the first screen device 510 may transmit the available application information-obtaining action 1400 to the second screen device 520 through the network interface 514.

The controller 523 of the second screen device 520 may receive the available application information-obtaining action 1400 through the network interface 524. Furthermore, the controller 523 of the second screen device 520 may transmit available application information to the first screen device 510 in response to the available application information-obtaining action 1400. In this case, the available application information may be determined based on the input information of the second application information-obtaining action. The input information may include at least one of the application identifier 1410, the reference information 1420, the device profile information 1430, and the filter information 1440.

FIG. 15 shows a running application information-obtaining action and an argument thereof according to an embodiment to which the present invention may be applied.

The running application information-obtaining action 1500 may enable a screen control point to obtain a list of applications that are being executed. Furthermore, the name of the running application information-obtaining action 1500 may be indicated as GetRunningApp ( ).

The arguments of the running application information-obtaining action 1500 may include application information 1510 that is running.

In this case, the application information 1510 that is running may mean a list of applications that are being executed. For example, the application information 1510 that is running may mean a list of the identifiers of applications in which a variable "running status information ("RunningStatus") included in an application information list has been set as "Running."

The embodiment of FIG. 15 may be performed by the elements of FIG. 5. For example, the controller 513 of the first screen device 510 may transmit the running application information-obtaining action 1500 to the second screen device 520 through the network interface 514.

The controller 523 of the second screen device 520 may receive the running application information-obtaining action 1500 through the network interface 524. Furthermore, the controller 523 of the second screen device 520 may transmit application information that is running to the first screen device 510 in response to the running application information-obtaining action 1500.

FIG. 16 shows a running status information-obtaining action and arguments thereof according to an embodiment to which the present invention may be applied.

The running status information-obtaining action 1600 may enable a screen control point to obtain running status information about an application specified by an application identifier. Furthermore, the name of the running status information-obtaining action 1600 may be indicated as GetRunningStatus ( ).

The arguments of the running status information-obtaining action 1600 may include an application identifier 1610 and running status information 1620.

In this case, the application identifier 1610 is indicative of an application for obtaining running status information. The contents described in connection with the aforementioned embodiments may be likewise applied to the application identifier 1610.

The running status information "RunningStatus" 1620 may be indicative of a specific portion of an application information list. The running status information 1620 may include the components and attributes of an application specified by the application identifier 1610 and running status components thereof.

The embodiment of FIG. 16 may be performed by the elements of FIG. 5. For example, the controller 513 of the first screen device 510 may transmit the running status information-obtaining action 1600 to the second screen device 520 through the network interface 514.

The controller 523 of the second screen device 520 may receive the running status information-obtaining action 1600 through the network interface 524. Furthermore, the controller 523 of the second screen device 520 may transmit the running status information 1620 of an application that is running to the first screen device 510 in response to the running status information-obtaining action 1600.

FIG. 17 shows a first application activation action and arguments thereof according to an embodiment to which the present invention may be applied.

The first application activation action 1700 may enable an application, included in an application information list, to run on a screen device. The application may be identified by an application identifier. Furthermore, the first application activation action 1700 may be used to provide the activation parameter information of an application that is running. Furthermore, the name of the first application activation action 1700 may be indicated as ActivateAppByID ( ).

The arguments of the first application activation action 1700 may include an application identifier 1710 and parameter information 1720.

In this case, the application identifier 1710 is indicative of an application to be activated. The contents described in connection with the aforementioned embodiments may be likewise applied to the application identifier 1710.

The parameter information 1720 may be indicative of a parameter type. For example, the parameter type may be indicative of any one of activation parameter information and installation parameter information.

The embodiment of FIG. 17 may be performed by the elements of FIG. 5. For example, the controller 513 of the first screen device 510 may transmit the first application activation action 1700 to the second screen device 520 through the network interface 514.

The controller 523 of the second screen device 520 may receive the first application activation action 1700 through the network interface 524. Furthermore, the controller 523 of the second screen device 520 may activate an application within the second screen device 520 in response to the first application activation action 1700.

FIG. 18 shows a second application activation action and arguments thereof according to an embodiment to which the present invention may be applied.

The second application activation action 1800 may enable an application to run on a screen device using a URI. Furthermore, the second application activation action 1800 may be used to provide activation parameter information about an application that is subjected to transitioning pending input. Furthermore, the name of the second application activation action 1800 may be indicated as ActivateApp-ByURI ( ).

The arguments of the second application activation action 1800 may include at least one of activation URI information 1810, application information 1820, parameter information 1830, and an application identifier 1840.

In this case, the activation URI information 1810 is indicative of information about a URI from which an application will start.

The application information 1820 may be indicative of a specific portion of an application information list variable and may provide additional information about an application to be started. For example, the application information 1820 may include a name set by a user.

The parameter information 1830 may be indicative of a parameter type. For example, the parameter type may be indicative of any one of activation parameter information and installation parameter information.

The application identifier 1840 may be indicative of the identifier of a newly assigned application or may be indicative of the identifier of an application having the same URI as that of the activation URI information 1810. If an application is not installed and may be started using a URI and the activation URI information 1810 is not included in the application information list variable of a screen device, the screen device may start the application through the second application activation action 1800.

For example, when receiving the second application activation action 1800, a screen device may generate a new application component in an application information list. In this case, the new application component may include activation URI information and additional information. Furthermore, a new value may be assigned to an application identifier, and the new value may be returned through the application identifier 1840.

The embodiment of FIG. 18 may be performed by the elements of FIG. 5. For example, the controller 513 of the first screen device 510 may transmit the second application activation action 1800 to the second screen device 520 through the network interface 514.

The controller 523 of the second screen device 520 may receive the second application activation action 1800 through the network interface 524. Furthermore, the controller 523 of the second screen device 520 may activate an application within the second screen device 520 in response to the second application activation action 1800. That is, the controller 523 may activate an application based on information about a URI from which the application will start. The activated application may be returned through the display 521.

FIG. 19 shows a deactivation action and arguments thereof according to an embodiment to which the present invention may be applied.

The deactivation action 1900 may enable a designated application to be stopped by an application identifier on a screen device. The name of the deactivation action 1900 may be indicated as DeactivateApp ( ).

The arguments of the deactivation action 1900 may include an application identifier 1910 and a stopped application identifier 1920.

In this case, the application identifier 1910 is indicative of an application to be deactivated. The contents described in connection with the aforementioned embodiments may be likewise applied to the application identifier 1910.

The stopped application identifier 1920 is indicative of a list of the identifiers of stopped applications.

The embodiment of FIG. 19 may be performed by the elements of FIG. 5. For example, the controller 513 of the first screen device 510 may transmit the deactivation action 1900 to the second screen device 520 through the network interface 514.

The controller 523 of the second screen device 520 may receive the deactivation action 1900 through the network interface 524. Furthermore, the controller 523 of the second screen device 520 may stop an application within the second screen device 520 in response to the deactivation action 1900. The stopped application may be controlled by a user through the user interfaces 512 and 522.

FIG. 20 shows a first application installation action and arguments thereof according to an embodiment to which the present invention may be applied.

The first application installation action 2000 may enable an application to be installed on a screen device using information included in an application information list. Furthermore, the first application installation action 2000 may be used to provide the installation parameter information of an application that is subjected to installing-pending input. Furthermore, if the latest version is present, the first application installation action 2000 may be used to update an installed application with the latest version. The name of the first application installation action 2000 may be indicated as InstallAppByID ( ).

The arguments of the first application installation action 2000 may include an application identifier 2010 and parameter information 2020.

In this case, the application identifier 2010 is indicative of an application to be installed. The contents described in connection with the aforementioned embodiments may be likewise applied to the application identifier 2010.

The parameter information 2020 may be indicative of a parameter type. For example, the parameter type may be indicative of any one of activation parameter information and installation parameter information.

The embodiment of FIG. 20 may be performed by the elements of FIG. 5. For example, the controller 513 of the first screen device 510 may transmit the first application installation action 2000 to the second screen device 520 through the network interface 514. In this case, the first application installation action 2000 may include the application identifier 2010 and the parameter information 2020 as input information.

The controller 523 of the second screen device 520 may receive the first application installation action 2000 through the network interface 524. Furthermore, the controller 523 of the second screen device 520 may install an application in response to the first application installation action 2000.

FIG. 21 shows a second application installation action and arguments thereof according to an embodiment to which the present invention may be applied.

The second application installation action 2100 may enable an application to be installed on a screen device using a URI. Furthermore, the second application installation action 2100 may be used to provide the installation parameter information of an application that is subjected to installing-pending input. Furthermore, the name of the second application installation action 2100 may be indicated as InstallAppByURI.

The arguments of the second application installation action 2100 may include at least one of installation URI information 2110, application information 2120, parameter information 2130, and an application identifier 2140.

In this case, the installation URI information 2110 is indicative of information about a URL at which an application will be installed.

The application information 2120 may be indicative of a specific portion of an application information list variable and may provide additional information about an application to be installed. For example, the application information 2120 may include a name set by a user.

The parameter information 2130 may be indicative of a parameter type. For example, the parameter type may be indicative of any one of activation parameter information and installation parameter information.

The application identifier 2140 may be indicative of the identifier of a newly assigned application or may be indicative of the identifier of an application having the same URI as that of the installation URI information 2110. If the installation URI information 2110 is not included in the application information list variable of a screen device, the second application installation action 2100 may enable an application to be installed on a screen device.

For example, when the controller 523 of the second screen device 520 receives the second application installation action 2100 through the network interface 524, it may generate a new application component within an application information list variable. In this case, the new application component may include installation URI information and additional information. Furthermore, the controller 523 may assign a new value to an application identifier and return the new value through the application identifier 2140. The controller 523 may transmit the application identifier 2140 to which the new value has been assigned to the first screen device 510 through the network interface 524.

FIG. 22 shows an uninstallation action and arguments thereof according to an embodiment to which the present invention may be applied.

The uninstallation action 2200 may enable an application designated by an application identifier to be uninstalled from a screen device. The name of the uninstallation action 2200 may be indicated as UninstallApp ( ).

The arguments of the uninstallation action 2200 may include an application identifier 2210 and an uninstalled application identifier 2220.

In this case, the application identifier 2210 may be indicative of an application to be uninstalled. The contents described in connection with the aforementioned embodiments may be likewise applied to the application identifier 2210.

The uninstalled application identifier 2220 is indicative of a list of the identifiers of uninstalled applications.

The embodiment of FIG. 22 may be performed by the elements of FIG. 5. For example, the controller 513 of the first screen device 510 may transmit the uninstallation action 2200 to the second screen device 520 through the network interface 514. In this case, the uninstallation action 2200 may include the application identifier 2210 as input information.

The controller 523 of the second screen device 520 may receive the uninstallation action 2200 through the network interface 524. Furthermore, the controller 523 of the second screen device 520 may transmit the identifier of an uninstalled application to the first screen device 510 in response to the uninstallation action 2200.

FIG. 23 shows an installation status information-obtaining action and arguments thereof according to an embodiment to which the present invention may be applied.

The installation status information-obtaining action 2300 may enable a screen control point to obtain installation status information about an application specified by an application identifier. Furthermore, the name of the installation status information-obtaining action 2300 may be indicated as GetAppinstallationStatus ( ).

The arguments of the installation status information-obtaining action 2300 may include an application identifier 2310 and installation status information 2320.

In this case, the application identifier 2310 may be indicative of an application for obtaining installation status information. The contents described in connection with the aforementioned embodiments may be likewise applied to the application identifier 2310.

The installation status information "InstallationStatus" 2320 may be indicative of a specific portion of an application information list. The installation status information 2320 may include the components and attributes of an application specified by the application identifier 2310 and an installation status component thereof. For example, the installation status component may include "Installation Completed", "Download Pending", and "Installation Pending."

The embodiment of FIG. 23 may be performed by the elements of FIG. 5. For example, the controller 513 of the first screen device 510 may transmit the installation status information-obtaining action 2300 to the second screen device 520 through the network interface 514.

In this case, the installation status information-obtaining action 2300 may include the application identifier 2310 as input information.

The controller 523 of the second screen device 520 may receive the installation status information-obtaining action 2300 through the network interface 524. Furthermore, the controller 523 of the second screen device 520 may transmit any one of the pieces of installation status information, that is, "Installation Completed", "Download Pending", and "Installation Pending", to the first screen device 510 in response to the installation status information-obtaining action 2300.

FIG. 24 shows a connection information-obtaining action and arguments thereof according to an embodiment to which the present invention may be applied.

The connection information-obtaining action 2400 may enable a screen control point to obtain information about the connection of applications specified by an application identifier. Furthermore, the name of the connection information-obtaining action 2400 may be indicated as GetAppConnectionInfo ( ).

The arguments of the connection information-obtaining action 2400 may include an application identifier 2410 and connection information 2420.

In this case, the application identifier 2410 may be indicative of an application for obtaining connection information. The contents described in connection with the aforementioned embodiments may be applied to the application identifier 2410.

The connection information 2420 may be indicative of a specific portion of an application information list. The connection information 2420 may include the components and attributes of applications specified by the application identifier 2410 and information components between the applications. For example, the information components between the applications may include at least one of specific protocol name information, transport protocol information, and connection address information. In this case, the connection address information may mean access information for communication between the applications.

The embodiment of FIG. 24 may be performed by the elements of FIG. 5. For example, the controller 513 of the first screen device 510 may transmit the connection information-obtaining action 2400 to the second screen device 520 through the network interface 514. In this case, the connection information-obtaining action 2400 may include the application identifier 2410 as input information.

The controller 523 of the second screen device 520 may receive the connection information-obtaining action 2400 through the network interface 524. Furthermore, the controller 523 of the second screen device 520 may transmit the connection information 2420, for example, at least one of the specific protocol name information, the transport protocol information, and the connection address information to the first screen device 510 in response to the connection information-obtaining action 2400.

The first screen device 510 and the second screen device 520 are connected through the network interfaces 514 and 524 based on the connection information 2420, thus being capable of communicating with each other.

FIG. 25 shows an apptoapp connection action and arguments thereof according to an embodiment to which the present invention may be applied.

The apptoapp connection action 2500 is used to configure a screen device and an apptoapp connection and enables connection management. The name of the apptoapp connection action 2500 may be indicated as ConnectApptoApp ( ).

The arguments of the apptoapp connection action 2500 may include an application identifier 2510 and a connection identifier 2520.

In this case, the application identifier 2510 is indicative of an application for configuring a screen device and an apptoapp connection.

The connection identifier 2520 is indicative of the identifier of the configured apptoapp connection and may be assigned by a screen device.

The embodiment of FIG. 25 may be performed by the elements of FIG. 5. For example, the controller 513 of the first screen device 510 may transmit the apptoapp connection action 2500 to the second screen device 520 through the network interface 514. In this case, the apptoapp connection action 2500 may include the application identifier 2510 as input information.

The controller 523 of the second screen device 520 may receive the apptoapp connection action 2500 through the network interface 524. Furthermore, the controller 523 of the second screen device 520 may transmit the connection identifier 2520 to the first screen device 510 in response to the apptoapp connection action 2500.

The first screen device 510 and the second screen device 520 may perform a connection for providing a multi-screen service based on the connection identifier 2520.

FIG. 26 shows an apptoapp disconnection (i.e., a disconnection between applications) action and arguments thereof according to an embodiment to which the present invention may be applied.

The application disconnection action 2600 may be used to disconnect an apptoapp connection, specified by a connection identifier, from a screen device. The name of the application disconnection action 2600 may be indicated as DisconnectApptoApp ( ).

The arguments of the application disconnection action 2600 may include a connection identifier 2610 and a disconnected connection identifier 2620.

In this case, the connection identifier 2610 is indicative of a connection to be disconnected, and the disconnected connection identifier 2620 is indicative of a list of the identifiers of disconnected apptoapp disconnections.

The embodiment of FIG. 26 may be performed by the elements of FIG. 5. For example, the controller 513 of the first screen device 510 may transmit the application disconnection action 2600 to the second screen device 520 through the network interface 514. In this case, the application disconnection action 2600 may include the connection identifier 2610 as input information.

The controller 523 of the second screen device 520 may receive the application disconnection action 2600 through the network interface 524. Furthermore, the controller 523 of the second screen device 520 may transmit the disconnected connection identifier 2620 to the first screen device 510 in response to the application disconnection action 2600.

A connection between the first screen device 510 and the second screen device 520 is disconnected based on the disconnected connection identifier 2620.

FIG. 27 shows a current connection information-obtaining action and arguments thereof according to an embodiment to which the present invention may be applied.

The current connection information-obtaining action 2700 enables a screen control point to collect apptoapp connection information which has been established by the apptoapp connection action and which is now supported by a screen device. The name of the current connection information-obtaining action 2700 may be indicated as GetCurentConnectionInfo ( ).

The arguments of the current connection information-obtaining action 2700 may include a connection identifier 2710 and connection application identifiers 2720.

In this case, the connection identifier 2710 may be indicative of the identifier of a current apptoapp connection.

The connection application identifiers 2720 may be indicative of application identifiers corresponding to an apptoapp connection.

The embodiment of FIG. 27 may be performed by the elements of FIG. 5. For example, the controller 513 of the first screen device 510 may transmit the current connection information-obtaining action 2700 to the second screen device 520 through the network interface 514. In this case, the current connection information-obtaining action 2700 may include the connection identifier 2710 as input information.

The controller 523 of the second screen device 520 may receive the current connection information-obtaining action 2700 through the network interface 524. Furthermore, the controller 523 of the second screen device 520 may transmit application identifiers corresponding to an apptoapp connection to the first screen device 510 in response to the current connection information-obtaining action 2700.

FIG. 28 shows a searchable field-obtaining action and an argument thereof according to an embodiment to which the present invention may be applied.

The searchable field-obtaining action 2800 may enable a screen control point to obtain supported searchable field information. The name of the searchable field-obtaining action 2800 may be indicated as GetSupportedTargetFields ( ).

The argument of the searchable field-obtaining action 2800 may include supported searchable field information 2810. In this case, the supported searchable field information 2810 is indicative of a list of searchable fields. This may be a component of the application information list of a screen device. The supported searchable field information 2810 may include at least one of an application name and protocol name generated by a user.

The embodiment of FIG. 28 may be performed by the elements of FIG. 5. For example, the controller 513 of the first screen device 510 may transmit the searchable field-obtaining action 2800 to the second screen device 520 through the network interface 514.

The controller 523 of the second screen device 520 may receive the searchable field-obtaining action 2800 through the network interface 524. Furthermore, the controller 523 of the second screen device 520 may transmit the supported searchable field information 2810, for example, at least one of an application name and protocol name generated by a user to the first screen device 510 in response to the searchable field-obtaining action 2800.

FIG. 29 shows state variables for application management according to an embodiment to which the present invention may be applied.

In an embodiment of the present invention, state variables for application management may include at least one of an application information list 2901, available application information 2902, searchable field information 2903, an application identifier 2904, search information 2905, searchable field information 2906, filter information 2907, a running application list 2908, URI information 2909, parameter information 2910, and a connection identifier 2911.

The application information list 2901 may include information about all of applications included in a screen device for a multi-screen service. The application information list 2901 may be represented in an XML template form and may include a sub-component structure.

For example, the application information list 2901 may include an application component. If the number of application components is plural, the application information list 2901 may be indicative of a structure including the attributes and sub-components of applications for each application.

The application component may include at least one of an application identifier, a market application identifier component, a user description component, a replacement identifier component, a function element, a running status component, an activation URI component, an installation status component, a downloading status component, an installing status component, an installation URI component, a user policy component, an apptoapp information component, and an icon list component.

The application identifier is indicative of the unique identifier of an application within an application management service.

The market application identifier component is indicative of the identifier of an application assigned by an application market and may include market information and version information. In this case, the market information is indicative of the identifier of a digital platform through which the application is provided. The version information is indicative of the version of the application.

The user description component is indicative of the description words of an application generated by a user, and may include language information.

The replacement identifier component is indicative of the identifier of an application used in a standard institute, and may include institute information. The institute information may mean the domain name of the standard institute.

The running status component is indicative of the activation status of an application on a screen device. The activation status may be indicative of one of "Deactivation", "Transitioning", "Transitioning Pending Input", "Running", and "Unknown."

The activation URI component is indicative of a URI which may be accessible to a screen control point in order to start an application, and may include device type information. In this case, the device type information is indicative of a device type to which an application may be applied. The device type may mean a main screen device or a companion screen device or both.

The installation status component is indicative of the installation status of an application designated by an application identifier on a screen device. The installation status may be indicative of one of "Not Downloaded", "Downloading", "Downloading-Pending Input", "Not Installed", "Installing", "Installation-Pending Input", "Installation Completed", and "Unknown."

The downloading status component is applied only when the installation status component is "Downloading." The degree of downloading may be represented as a percentage between 0 and 100.

The installing status component is applied only when the installation status component is "Installing." The degree of installing may be represented as a percentage between 0 and 100.

The installation URI component is indicative of a URI which may be accessible to a screen control point in order to install an application, and may include device type information. In this case, the device type information is indicative of a device type to which the application may be applied. The device type may mean a main screen device or a companion screen device or both.

The user policy component is indicative of permission-related information for an application use. The permission-related information may be indicative of one of "No Restriction", "Purchase Required", "Trial Only", "Parental Consent Required", and "Login Required."

The apptoapp information component is indicative of information for generating an apptoapp connection and may be supported if the running status component is at least "Running." The apptoapp information component may include at least one of a matching protocol name component, a protocol component, and a connection address component. The matching protocol name component is indicative of a manufacturer-defined protocol name. The protocol component is indicative of the protocol of a transport layer and may include, for example, an HTTP, a websocket, and UPnP. The connection address component is indicative of access information for communication between applications. The connection address component may include, for example, an HTTP URI, a websocket URI, an uuid:device-uuid, and a manufacturer-defined address.

The available application information 2902 is indicative of information about applications available in a corresponding time in order to provide a multi-screen service.

The supported searchable field information 2903 is indicative of a list of searchable fields.

The application identifier argument 2904 provides information about the type of various application identifiers within various actions.

The search information argument 2905 is indicative of information about the type of search information.

The searchable field information argument 2906 is indicative of information about the type of searchable field information.

The filter information argument 2907 is indicative of information used to obtain application information that satisfies a specific condition.

The running application list 2908 provides a list of applications that are running.

The URI information argument 2909 is indicative of information about the type of any one of an activation URI argument and an installation URI argument.

The parameter information argument 2910 is indicative of information about the type of any one of an activation parameter argument and an installation parameter argument.

The connection identifier argument 2911 is indicative of a list of the unique identifiers of apptoapp connections.

Figure 30:
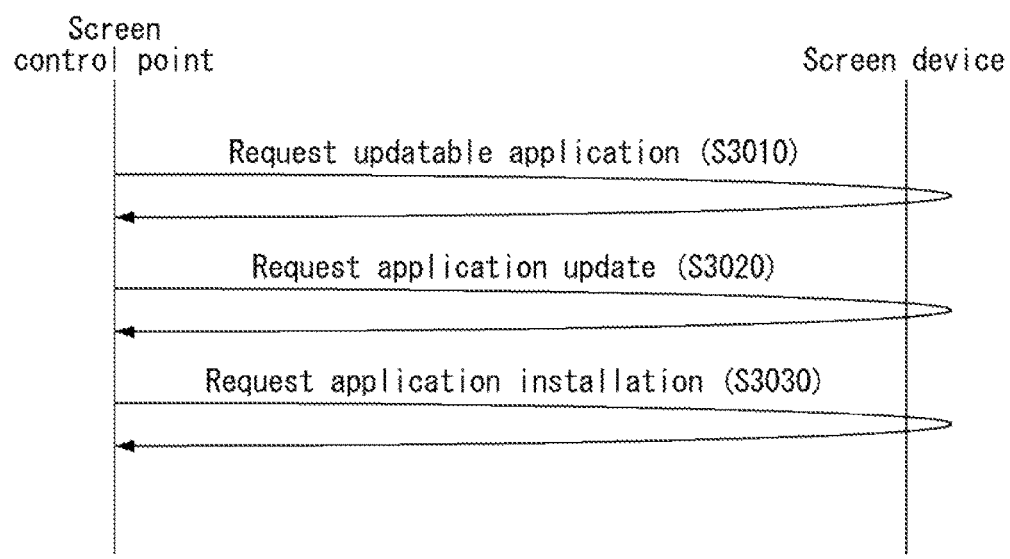
FIG. 30 shows a process for updating an application according to an embodiment to which the present invention may be applied.

FIG. 30 shows a process for updating an application according to an embodiment to which the present invention may be applied.

In order to update an application for providing a multi-screen service, at least one of an updatable application-obtaining action and an application update action may be required.

A screen control point may request a screen device to obtain an updatable application (S3010). In this case, an updatable application-obtaining action may be used. The updatable application-obtaining action may enable the screen control point to obtain a list of applications whose version may be updated. The screen device may transmit the list of applications whose version may be updated to the screen control point in response to the updatable application-obtaining action.

The screen control point may request an application update for applications not having the latest version (S3020). In this case, an application update action may be used. The application update action may include version information. If the version information has nothing information, it may mean that an application needs to be updated with the latest version. In response to the request, the screen device may update the applications not having the latest version with the latest version.

The screen control point may request the screen device to install the updated application thereon (S3030). In this case, an application installation action may be used. The application installation action may be installed based on an application identifier or may be performed based on an installation Uniform Resource Identifier (URI).

Figure 31:
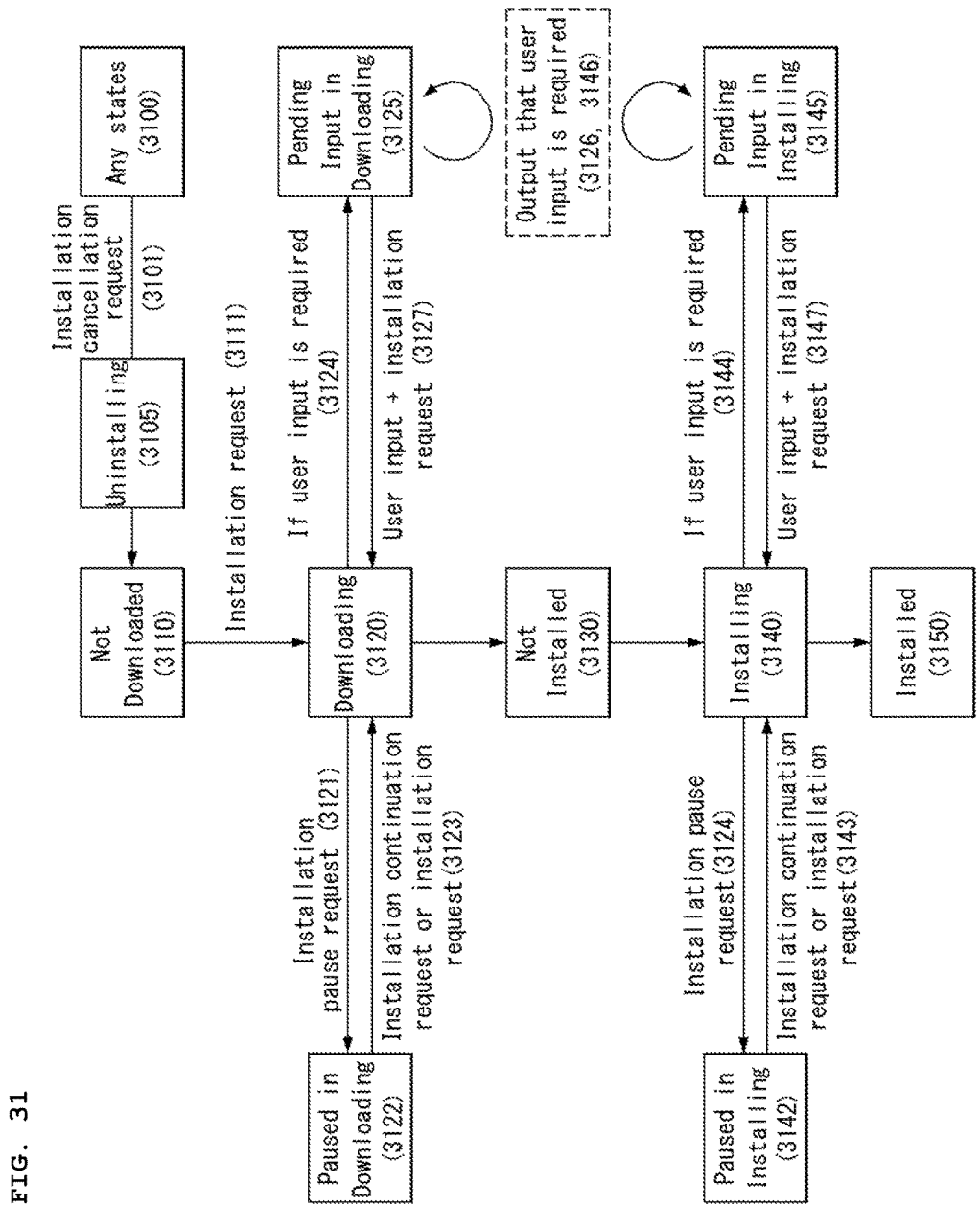
FIG. 31 shows the state diagram of the installation of an application according to an embodiment to which the present invention may be applied.

FIG. 31 shows the state diagram of the installation of an application according to an embodiment to which the present invention may be applied.

First, if an application has not been downloaded (3110), a user may request application installation through a screen control point (3111). In this case, it may consider that the application has not been downloaded although the application is uninstalled (3105) in response to an installation cancellation request (3101) if the application has any state (3100).

In response to the installation request, a screen device may download the application (3120). In this case, if there is an installation pause request from a user (3121), the downloading of the application is paused (3122). When an installation continuation request or an installation request is received from the user (3123), the screen device may continue to download the application (3120).

Alternatively, if the user's input is required during the downloading (3124), the screen device may be in the user pending input state in the download process (3125). In this case, the screen device may display that it is in the user pending input state (3126). When an installation request is received along with the user's input (3127), the screen device continues to download the application (3120).

The screen device may be in an installation uncompleted state during downloading (3130) and may become an installing state (3140). In this case, if there is an installation pause request from the user (3141), the installation of the application is paused (3142). When an installation continuation request or an installation request is received from the user (3143), the screen device may continue to install the application (3140).

Alternatively, if the user's input is required during the installation (3144), the screen device may be in the user pending input state in the installation process (3145). In this case, the screen device may display that it is in the user pending input state (3146). When an installation request is received along with the user's input (3147), the screen device may continue to install the application (3140).

When the installation is completed, the screen device becomes an installation completed state (3150).

Figure 32:
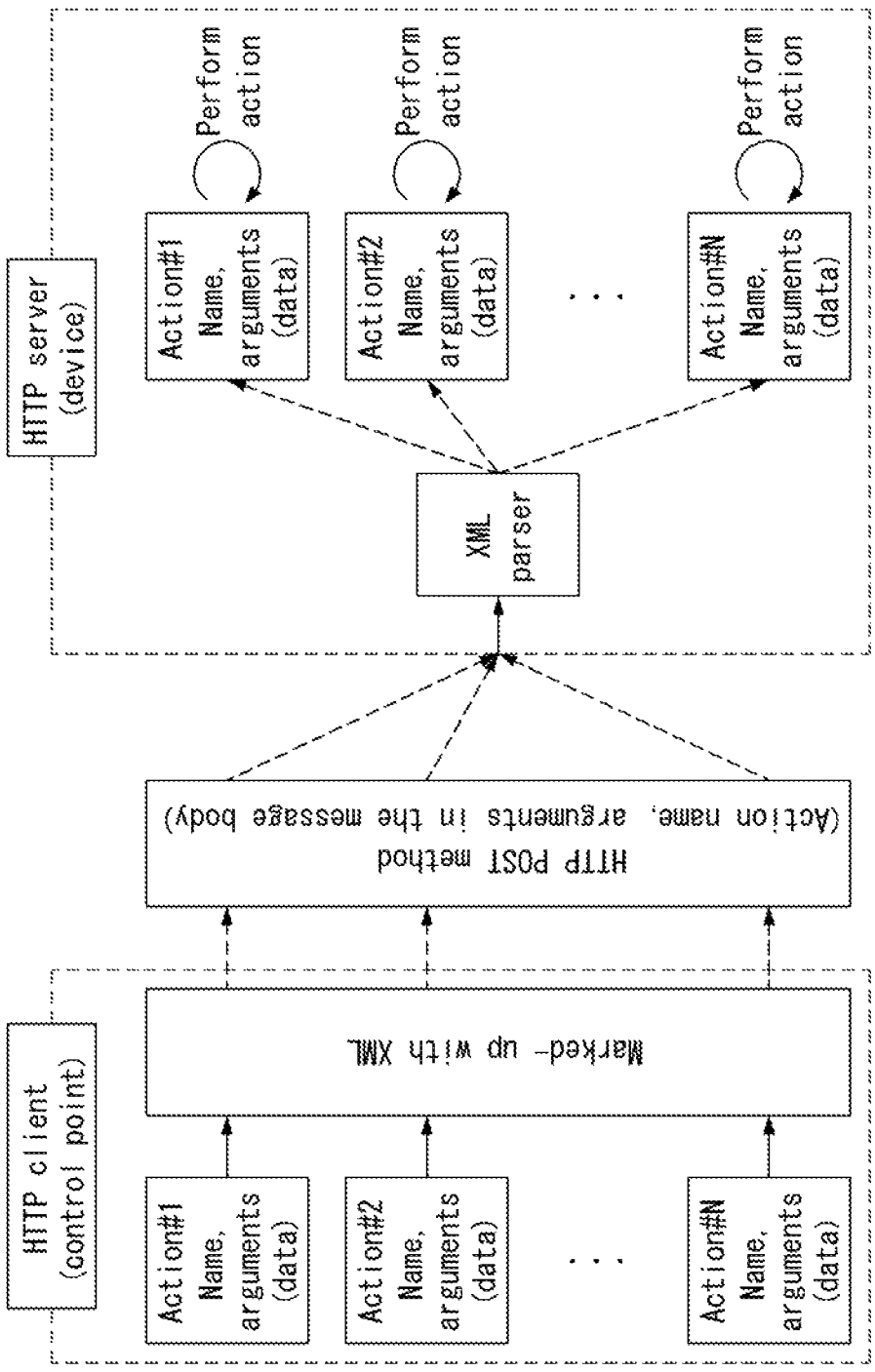
FIG. 32 is a block diagram illustrating a Universal Plug and Play (UPnP) mechanism according to an embodiment to which the present invention may be applied.

FIG. 32 is a block diagram illustrating a Universal Plug and Play (UPnP) mechanism according to an embodiment to which the present invention may be applied.

An UPnP action proposed according to an embodiment of the present invention is one of examples of various D2D communication methods, and is indicative of a control URL obtained in a UPnP discovery and description information transmission process. The UPnP action may deliver data to be actually delivered in an XML form through an HTTP POST message body using a POST method defined in HTTP. In the case of an UPnP protocol, an action name is defined in each action and used, and the action name is also delivered through an HTTP POST message body delivered in an XML form. Accordingly, unlimited types of actions (or messages) can be exchanged although there is only one URL for a target device and only one HTTP POST method is used.

Figure 33:
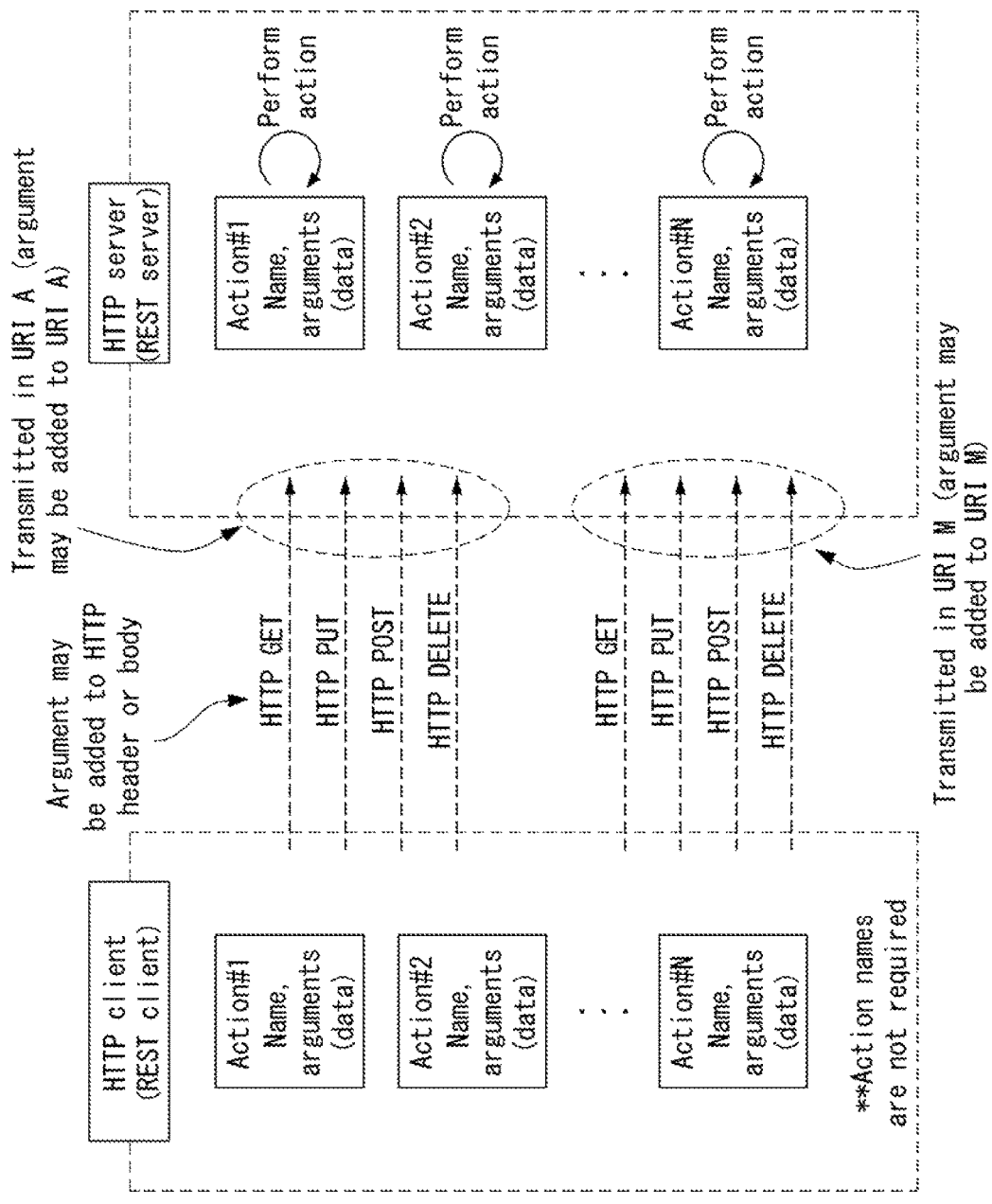
FIG. 33 is a block diagram illustrating a REpresentational State Transfer (REST) mechanism according to an embodiment to which the present invention may be applied.

FIG. 33 is a block diagram illustrating a REpresentational State Transfer (REST) mechanism according to an embodiment to which the present invention may be applied.

For example, D2D communication proposed according to an embodiment of the present invention may be applied even without defining an action name if several methods, such as GET, HEAD, PUT, DELETE, TRACE, OPTIONS, CONNECT, and PATCH, are used in addition to POST of HTTP methods and a plurality of URIs from which a target device will be accessed. Data to be delivered may be added to a corresponding URI and delivered or may be included in an HTTP body in various forms and delivered. However, a plurality of URI values for such an REST method may be obtained in a discovery and description information transmission process.

The various embodiments described in this specification may be implemented in a recording medium readable by a computer or similar devices using software or hardware or a combination of them, for example.

According to a hardware implementation, an embodiment described herein may be implemented using at least one of Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and other electrical units for executing functions. In some cases, the embodiments described in this specification may be implemented using the controller or the control point.

According to a software implementation, embodiments, such as procedures or functions, may be implemented along with a software module for performing at least one function or operation. Software code may be implemented by a software application written in a proper program language. The software code may be stored in the memory and executed by the control unit.

In accordance with an embodiment of the present invention, the aforementioned method may be implemented in a medium on which a program has been recorded in the form of processor-readable code. The processor-readable medium may include ROM, RAM, CD-ROM, a magnetic tape, a floppy disk, and an optical data storage device, for example. Furthermore, the processor-readable medium includes an implementation in the form of carrier waves (e.g., transmission through the Internet).

INDUSTRIAL APPLICABILITY

The configurations and methods of the aforementioned embodiments are not limited and applied to the devices described above, and the embodiments may be constructed by selectively combining part of or the entire of each of the embodiments so that they are modified in various ways.

The invention claimed is:

1. An operation method of a first device including a network interface in a Universal Plug and Play (UPnP) network, the method comprising: transmitting, by the network interface of the first device, an activation action for indicating an activation of a first application to a second device in the UPnP network, wherein the activation action comprises application identifier information or application address information of the first application; transmitting, by the network interface of the first device, a request action for requesting application connection information used for an application-to-application connection to the activated first application, wherein the request action comprises application identifier information of the first application, wherein the application connection information: comprises protocol information and connection address information of the first application, and is supported at least when the first application is activated; receiving, by the network interface of the first device, the application connection information from the second device; performing, by the network interface of the first device, the application-to-application connection between the first application of the second device and a second application of the first device based on the connection information; and transmitting, by the network interface of the first device, an installation request action for indicating an installation of a third application to the second device, wherein the installation request action comprises application identifier information or application address information of the third application, and wherein the third application is installed based on the installation request action.

2. The method of claim 1, further comprising:
transmitting, by the network interface of the first device, an authentication check action to the second device, wherein the authentication check is performed by comparing code information included in the authentication check action with code information included in the second device.

3. A first device in a Universal Plug and Play (UPnP) network, the first device comprising: a network interface configured to: transmit an activation action for indicating an activation of a first application to a second device in the UPnP network, wherein the activation action comprises application identifier information or application address information of the first application, transmit a request action for requesting application connection information used for an application-to-application connection to the activated first application, wherein the request action comprises application identifier information of the first application, and wherein the application connection information: comprises protocol information and connection address information of the first application, and is supported at least when the first application is activated, receive the application connection information from the second device; perform the application-to-application connection between the first application of the second device and a second application of the first device based on the connection information, and transmit an installation request action for indicating an installation of a third application to the second device, wherein the installation request action comprises application identifier information or application address information of the third application, and wherein the third application is installed based on the installation request action.

4. The first device of claim 3, wherein:
the network interface is further configured to transmit, by controlling the network interface, an authentication check action to the second device, and
the authentication check is performed by comparing code information included in the authentication check action with code information included in the target device.

5. The method of claim 1, wherein:
the performing, by the network interface of the first device, the application-to-application connection comprises transmitting, by the network interface of the first device, a connection request for requesting the application-to-application connection to the second device, and
the connection request comprises the application identifier information of the first application.

6. The first device of claim 3, wherein:
the network interface is configured to transmit a connection request for requesting the application-to-application connection to the second device when performing the application-to-application connection, and
the connection request comprises the application identifier information of the first application.

* * * * *